(12) United States Patent
Reece et al.

(10) Patent No.: US 8,361,288 B2
(45) Date of Patent: Jan. 29, 2013

(54) COMPOSITIONS, ELECTRODES, METHODS, AND SYSTEMS FOR WATER ELECTROLYSIS AND OTHER ELECTROCHEMICAL TECHNIQUES

(75) Inventors: Steven Y. Reece, Cambridge, MA (US); Arthur J. Esswein, Boston, MA (US); Kimberly Sung, New York, NY (US); Zachary I. Green, Somerville, MA (US); Daniel G. Nocera, Winchester, MA (US)

(73) Assignee: Sun Catalytix Corporation, Cambridge, MA (US)

( * ) Notice: Subject to any disclaimer, the term of this patent is extended or adjusted under 35 U.S.C. 154(b) by 139 days.

(21) Appl. No.: 12/870,530

(22) Filed: Aug. 27, 2010

(65) Prior Publication Data
US 2011/0048962 A1 Mar. 3, 2011

Related U.S. Application Data

(60) Provisional application No. 61/237,507, filed on Aug. 27, 2009, provisional application No. 61/266,826, filed on Dec. 4, 2009, provisional application No. 61/285,844, filed on Dec. 11, 2009, provisional application No. 61/310,084, filed on Mar. 3, 2010, provisional application No. 61/365,102, filed on Jul. 16, 2010.

(51) Int. Cl.
*C25B 11/06* (2006.01)
*H01M 4/02* (2006.01)
*H01M 4/134* (2010.01)
*H01M 4/38* (2006.01)
*H01M 4/42* (2006.01)
*H01M 4/44* (2006.01)

(52) U.S. Cl. ........ 204/293; 204/291; 429/523; 429/524; 429/525; 429/526; 429/527

(58) Field of Classification Search .................. 204/291, 204/292, 293, 284; 205/630, 631, 637, 638, 205/639, 636; 429/523–528; 502/101, 118
See application file for complete search history.

(56) References Cited

U.S. PATENT DOCUMENTS

| | | | |
|---|---|---|---|
| 4,537,674 A * | 8/1985 | Ovshinsky et al. | 204/290.01 |
| 7,175,751 B2 * | 2/2007 | Venkatesan et al. | 205/639 |
| 2004/0180203 A1 | 9/2004 | Yadav et al. | |
| 2007/0026292 A1 | 2/2007 | Adzic et al. | |
| 2007/0222066 A1 | 9/2007 | Cabral, Jr. et al. | |
| 2008/0219918 A1* | 9/2008 | Lee et al. | 423/648.1 |
| 2009/0294282 A1 | 12/2009 | Basseguy et al. | |
| 2010/0101955 A1 | 4/2010 | Nocera et al. | |
| 2010/0133110 A1 | 6/2010 | Nocera et al. | |
| 2010/0133111 A1 | 6/2010 | Nocera et al. | |

FOREIGN PATENT DOCUMENTS

| | | |
|---|---|---|
| EP | 2 085 501 | 8/2009 |
| FR | 2 904 330 | 2/2008 |
| WO | WO 2009/093082 | 7/2009 |
| WO | WO 2009/154753 | 12/2009 |
| WO | WO 2011/028262 | 3/2011 |
| WO | WO 2011/028264 | 3/2011 |

OTHER PUBLICATIONS

U.S. Appl. No. 61/073,701, filed Jun. 18, 2008, Nocera.
U.S. Appl. No. 61/084,948, filed Jul. 30, 2008, Nocera.
U.S. Appl. No. 61/103,879, filed Oct. 8, 2008, Nocera.
U.S. Appl. No. 61/146,484, filed Jan. 22, 2009, Nocera.
U.S. Appl. No. 61/179,581, filed May 19, 2009, Nocera.
U.S. Appl. No. 61/237,507, filed Aug. 27, 2009, Esswein et al.
U.S. Appl. No. 61/266,826, filed Dec. 4, 2009, Reece et al.
U.S. Appl. No. 61/285,844, filed Dec. 11, 2009, Esswein et al.
U.S. Appl. No. 61/310,084, filed Mar. 3, 2010, Reece et al.
U.S. Appl. No. 61/365,102, filed Jul. 16, 2010, Reece et al.
Hamann et al., "Elektrochemie", Wiley-VCH, Dec. 31, 1998, p. 386.
International Patent Application No. PCT/US2010/002366: International Search Report dated May 30, 2011, 7 pages.
International Patent Application No. PCT/US2010/002368: International Search Report dated Mar. 2, 2011, 3 pages.
Nocera et al., "In Situ Formation of an Oxygen-Evolving Catalyst in Neutral Water Containing Phosphate and Co2+", Science, Aug. 22, 2008, 321(5892), 1072-1075.
Surendranath et al., "Electrolyte-dependent electrosynthesis and activity of cobalt-based water oxidation catalysts", Journal of the American Chemical Society, Feb. 25, 2009, 131, 2615-2620.

* cited by examiner

*Primary Examiner* — Bruce Bell
(74) *Attorney, Agent, or Firm* — Woodcock Washburn, LLP

(57) ABSTRACT

Compositions, electrodes, systems, and/or methods for water electrolysis and other electrochemical techniques are provided. In some cases, the compositions, electrodes, systems, and/or methods are for electrolysis which can be used for energy storage, particularly in the area of energy conversion, and/or production of oxygen, hydrogen, and/or oxygen and/or hydrogen containing species. In some embodiments, the water for electrolysis comprises at least one impurity and/or at least one additive which has little or no substantially affect on the performance of the electrode.

4 Claims, 7 Drawing Sheets

COMPOSITIONS, ELECTRODES, METHODS, AND SYSTEMS FOR WATER ELECTROLYSIS AND OTHER ELECTROCHEMICAL TECHNIQUES

RELATED APPLICATIONS

This application claims the benefit of U.S. Provisional Patent Application Ser. No. 61/237,507, filed Aug. 27, 2009, entitled "Improved Methods and Compositions Involving Catalytic Materials, Electrodes, and Systems for Water Electrolysis and Other Electrochemical Techniques," by Esswein, et al., U.S. Provisional Patent Application Ser. No. 61/266,826, filed Dec. 4, 2009, entitled "Electrodes, Methods, and Systems for Water Electrolysis and Other Electrochemical Techniques," by Reece, et al., U.S. Provisional Patent Application Ser. No. 61/285,844, filed Dec. 11, 2009, entitled "Improved Methods and Compositions Involving Catalytic Materials, Electrodes, and Systems for Water Electrolysis and Other Electrochemical Techniques," by Esswein, et al., U.S. Provisional Patent Application Ser. No. 61/310,084, filed Mar. 3, 2010, entitled "Electrodes, Methods, and Systems for Water Electrolysis and Other Electrochemical Techniques," by Reece, et al., and U.S. Provisional Patent Application Ser. No. 61/365,102, filed Jul. 16, 2010, entitled "Electrodes, Methods, and Systems for Water Electrolysis and Other Electrochemical Techniques," by Reece, et al., each incorporated herein by reference.

FIELD OF THE INVENTION

This invention relates generally to compositions, electrodes, methods, and systems for water electrolysis and other electrochemical techniques. In some cases, the invention relates to hydrogen production or oxidation.

BACKGROUND OF THE INVENTION

Electrolysis of water, that is, splitting water into oxygen and hydrogen gases, is a very important process not only for the production of oxygen and/or hydrogen gases, but for energy storage. Energy is consumed in splitting water into hydrogen and oxygen gases and, when hydrogen and oxygen gases are re-combined to form water, energy is released.

In order to store energy via electrolysis, materials are required which efficiently mediate the bond rearranging "water splitting" reaction to $O_2$ and $H_2$. The standard reduction potentials for the $O_2/H_2O$ and $H_2O/H_2$ half-reactions are given by Equation 1 and Equation 2.

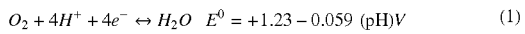
(1)

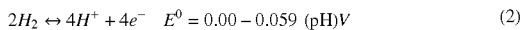
(2)

(3)

For a material to be efficient for this conversion, the material should operate at a potential close to the thermodynamic potential of each half-reaction, which are defined by half-cell potentials, $E°$ in Equations 1 and 2. Voltage in addition to $E°$ that is required to attain a given activity, referred to as overpotential, limits the conversion efficiency and considerable effort has been expended by many researchers in efforts to reduce overpotential in these reactions.

Hydrogen exhibits many advantages as a carbon-free energy storage medium: it has the highest energy density by mass of all chemical fuels, and it may be readily formed in a sustainable fashion via the electrolysis of water powered by renewable energy. However, despite the conceptually simple generation of hydrogen by water electrolysis, the energy efficiency and capital cost associated with water electrolysis have limited commercial applications, thus many attempts have focused on the improvement of the electrolytic generation of hydrogen. In particular, many electrodes that are used for hydrogen production may be unstable and/or inefficient for forming hydrogen gas from water comprising additives and/or impurities.

Accordingly, improved methods, systems, and electrodes are needed.

SUMMARY OF THE INVENTION

In some embodiments, a composition of matter is provided comprising molybdenum in an amount between about 0.1 wt % and about 90 wt %, zinc in an amount between about 0.1 wt % and about 90 wt %, and nickel in an amount between about 0.1 wt % and about 90 wt %.

In some embodiments, a catalytic material capable of oxidizing hydrogen gas and/or forming hydrogen gas is provided, the catalytic material comprising nickel, molybdenum, and zinc.

In some embodiments, a system capable of generating hydrogen and/or oxygen gas is provided comprising a first electrode comprising cobalt and/or nickel ions, and anionic species comprising phosphorus and/or boron, a second electrode comprising nickel and molybdenum.

In some embodiments, an electrode capable of forming hydrogen gas in the presence of an anionic species is provided, the electrode comprising a catalytic material comprising a first metal type, selected to be capable of forming hydrogen gas, a second metal type, selected to have an association constant of less than $10^3$ $M^{-1}$ with the anionic species, and a third metal type, selected so as to increase the surface area of the catalytic material, wherein the anionic species is not oxide or hydroxide.

In some embodiments, an electrode capable of oxidizing hydrogen gas is provided, the electrode comprising a catalytic material comprising a first metal type, selected to be capable of oxidizing hydrogen gas, a second metal type, and a third metal type, selected so as to increase the surface area of the catalytic material.

In some embodiments, a system capable of forming hydrogen and/or oxygen gas is provided, the system comprising a catalytic material comprising a first metal type selected to be capable of catalyzing the formation hydrogen gas from water, a second metal type, and a third metal type selected so as to increase the surface area of the catalytic material, and a photoactive composition.

In some embodiments, a method of forming hydrogen gas is provided, the method comprising exposing an electrode comprising a catalytic material to water containing at least one additive and/or at least one impurity, and wherein the pH of the water is between about 6 and about 10, and causing the formation of hydrogen gas, wherein hydrogen gas is formed with an absolute value of the overpotential of less than about 0.3 V at a current density of at least about 1 mA/cm².

In some embodiments, a method of forming hydrogen gas is provided, the method comprising exposing an electrode comprising a catalytic material to water containing at least one additive in a concentration of at least 0.1 M and/or at least one impurity in a concentration of at least 1 ppm, wherein the pH of the water is between about 6 and about 10, and causing the formation of hydrogen gas, wherein the current density of the electrode decreases by no more than about 10% over a period of 4 hours under essentially constant electrochemical conditions.

BRIEF DESCRIPTION OF THE DRAWINGS

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Figure 1:
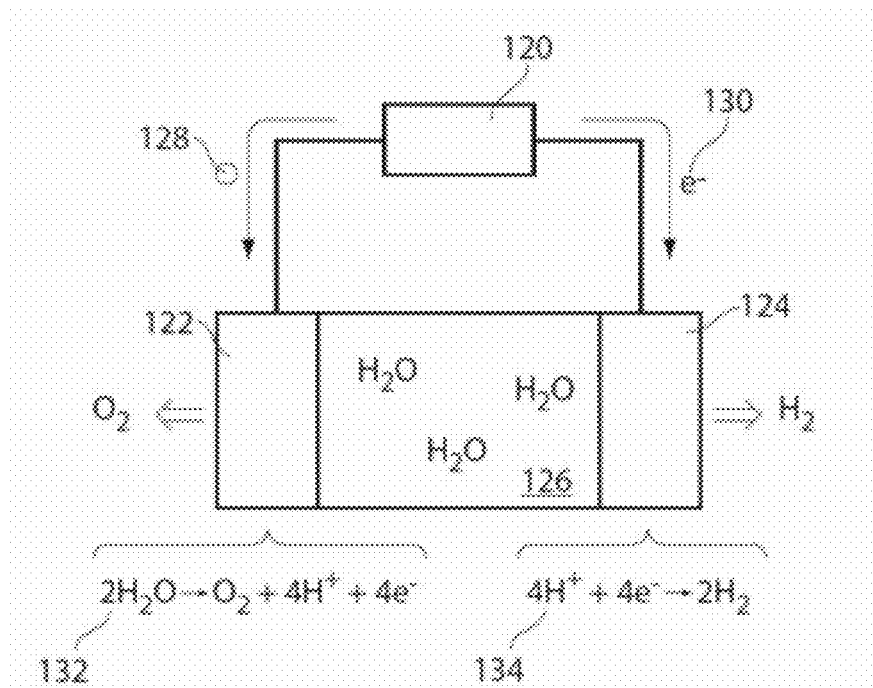
FIG. 1 shows a non-limiting example of an electrolytic device.

The present invention relates to compositions, electrodes, systems, and methods for electrolysis of water and other electrochemical techniques. In some cases, the invention relates to hydrogen and/or oxygen gas formation and/or the oxidation of hydrogen. One aspect of the invention involves catalytic materials, typically used for hydrogen generation or hydrogen oxidation, where the catalytic material includes two, three, or more metals selected for this purpose. The invention provides systems that can operate at improved activity, e.g. at low absolute value of the overpotential, high current density, significant efficiency, stability, or any combination. Systems of the invention also cans operate at or near neutral pH, without necessarily requiring highly pure water sources, or any combination. Combinations of various aspects of the invention are useful in significantly improved energy storage, energy use, and optional commercial production of hydrogen and/or oxygen gases. The subject matter of the present invention involves, in some cases, interrelated products, alternative solutions to a particular problem, and/or a plurality of different uses of one or more systems and/or articles.

Although the compositions, electrodes, systems, and methods described herein are primarily related to water electrolysis (i.e., forming oxygen gas, hydrogen gas, and/or other products from water) and/or the oxidation of hydrogen (e.g., hydrogen gas), the invention is not limited in this way. Where the invention is described as involving a first electrode and/or a second electrode (one or both of which can include a catalytic material), with production of oxygen gas via water electrolysis at the first electrode and/or production of hydrogen gas at the second electrode, it is to be understood that the first electrode can facilitate oxidation of any species, water or otherwise, to produce oxygen gas or another oxidized product. Examples of reactants that can be oxidized in this context can include methanol, formic acid, ammonia, etc. Examples of oxidized products can include $CO_2$, $N_2$, etc. At the second electrode, a reaction can be facilitated in which water (or hydrogen ions) is reduced to make hydrogen gas, but it is to be understood that a variety of reactants not limited to water (e.g., acetic acid, phosphoric acid, etc.) can be reduced to form hydrogen gas and any number of other products of the reduction reaction (e.g., acetate, phosphate, etc.). This reaction at the second electrode can be run in reverse, in "fuel cell" operation, such that hydrogen gas (and/or other exemplary products noted above) is oxidized to form water (and/or other exemplary reactants noted above). In some cases, the compositions, electrodes, methods, and/or systems may be used for reducing hydrogen gas. In some cases, the compositions, electrodes, methods, and/or systems may be used in connection with a photoelectrochemical cell. It should be understood that while much of the application herein focuses on the formation of hydrogen and/or oxygen gas from water, this is by no means limiting, and the compositions, electrodes, methods, and/or systems described herein may be used for other purposes, as described herein. Non-limiting examples of electrochemical devices provided by the invention include electrolytic devices and fuel cells. Energy can be supplied to electrolytic devices by photovoltaic cells, wind power generators, or other energy sources. These and other devices are described herein. In some cases, the catalytic materials and composition described herein may be use in connection with a photoactive material, as described herein.

Described herein, in some embodiments, are catalysts, electrodes, systems, and the like used to "produce" hydrogen gas, oxygen gas, or another species from a source such as water. It is to be understood that this means the reaction catalyzed can be the direct reaction from the source to the product, or the catalyst can facilitate such a reaction by catalyzing a reaction of a reactant to a product where the reactant originates from the source, but is not the source. For example, "forming" hydrogen gas from water includes, as one example in water under basic conditions, the reaction of water to form hydrogen gas, and as another example in water under acidic conditions, the reaction of hydrogen ion (ultimately from the source, water) to form hydrogen gas.

In all descriptions of the use of water for electrolysis herein, it is to be understood that the water may be provided in a liquid and/or gaseous state. The water used may be relatively pure, but need not be, and it is one advantage of the invention that relatively impure water can be used. The water provided can contain, for example, at least one impurity (e.g., halide ions such as chloride ions) and/or at least one additive (e.g., anionic species), as described herein. The presence of the at least one impurity and/or the at least one additive may have little or no substantial effect on the performance of the electrode, as described herein. In some embodiments, the pH of the water source may be at about neutral.

In some embodiments, an electrode of the present invention comprises catalytic material. In some cases, the catalytic material is associated with a current collector. Various catalytic material are described herein, including catalytic material comprising a plurality of metal elements and molecular catalysts.

In some embodiments, a catalytic material comprising a plurality of metal elements (e.g., two, three, four, five, or more, metal elements). For example, the catalytic material may be an alloy. The term "alloy," as used herein, is given its ordinary meaning in the art and refers to a composition comprising two or more metals or metalloids that have physical properties different than those of any of the metals by themselves. Alloys may be binary, ternary, quaternary, etc., depending on the number of metals or metalloids present in the mixture. An alloy may form mixed crystals, solid solutions, or chemical compounds. An alloy may be single phase solid solutions, stoichiometric compounds or consist of two or more phases where each phase may be a solid solution or stoichiometric compound. The alloy may or might not have the same composition throughout. For example, defects may be present in the material and/or areas of higher or lower concentration of one or more of the alloy components may be present in the overall catalytic material. As another example of an alloy as that term is used herein, small regions (on the micro- or nano-scale, e.g.) of one metal may be provided, coated with another metal and/or with another metal partially or fully filling interstices of the first metal. Another example of an alloy includes a mixture of metals where the mixture is not homogeneous on the molecular scale, but includes intermixed phases of the different metals with individual regions of single metal being of micro- or nanodimensions. But an alloy is distinguished from, e.g., a series of thin layers of metal defining a multi-layered structure. The alloy may be neutral or charged. Wherever "metal," or "metal type," or "metal element" is used herein, it is to be understood that a metalloid can be used to fulfill the purpose of the metal, where the metalloid is suitable for the purpose of the invention.

In some embodiments, a catalytic material may comprise a composition that meets the goals of the various aspects and embodiments of the invention as described herein. With guidance from this disclosure, those of ordinary skill in the art will be able to select suitable compositions, and efficiently test them for their potential use in accordance with the invention, without undue experimentation. In some embodiments, the composition (e.g., alloy) comprises nickel. Non-limiting embodiments of compositions include binary alloys (e.g., NiMo, NiFe, NiSn, NiS, NiZn, NiP, NiW, NiCu, NiCo, NiAl, CoP, CoMo, NiTi, etc.), ternary alloys (e.g., NiMoX where X is a metal such as Fe, Cu, Zn, Co, W, Cr, Cd, V, Ti, or the like, NiCoP, NiFeP, NiFeZn, NiCoZn, NiCuFe, NiCuMo, LaNiSi, etc.), or quaternary alloys (e.g., NiCoMnAl, etc.). Each of the metals or metalloids in the composition may be present in an atomic percent between 0.001 and 99.999%, such that the total atomic percent of the metal, metalloids, and/or other elements or compounds present totals about 100%. The amount of each of the metal or metalloid component of the composition may be varied in the composition. This may be accomplished using techniques known to those of ordinary skill in the art, for example, by providing varying amounts of each of the starting material prior to forming the composition. In a particular embodiment, the catalytic material comprises or consists essentially of nickel and molybdenum.

In a particular embodiments, a composition is provided comprising molybdenum, nickel, and zinc. In some cases, a composition comprising molybdenum, nickel, and zinc may be capable of forming hydrogen gas and/or oxidizing hydrogen gas (e.g., using the methods and systems described herein).

In some cases, the composition comprises between molybdenum in an amount between about 0.1 wt % and about 90 wt % (e.g., with respect to the total weight of the composition), zinc in an amount between about 0.1 wt % and about 90 wt %, and about 0.1% and about 90% nickel. In some cases, the composition comprises molybdenum in an amount between about 1 wt % and about 50 wt %, zinc in an amount between about 0.1 wt % and about 25 wt %, and the remainder nickel (e.g., between about 25 wt % and about 98.9 wt %. In some cases, the composition comprises molybdenum in an amount between about 1 wt % and about 50 wt %, zinc in an amount between about 0.1 wt % and about 10 wt %, and the remainder nickel (e.g., between about 40 wt % and about 98.9 wt %). In some cases, the composition comprises molybdenum in an amount between about 1 wt % and about 50 wt %, zinc in an amount between about 0.1 wt % and about 5 wt %, and the remainder nickel (e.g., between about 45 wt % and about 98.9 wt %). In some cases, the composition comprises molybdenum in an amount between about 1 wt % and about 50 wt %, zinc in an amount between about 0.1 wt % and about 1 wt %, and the remainder nickel (e.g., between about 49 wt % and about 98.9 wt %). In some cases, zinc may be present in an amount of about or less than about 90 wt %, about 80 wt %, about 70 wt %, about 60 wt %, about 50 wt %, about 40 wt %, about 30 wt %, about 25 wt %, about 20 wt %, about 10 wt %, or about 5 wt %. In some cases, nickel or molybdenum may be present in an amount of about or less than about 90 wt %, about 80 wt %, about 70 wt %, about 60 wt %, about 50 wt %, about 40 wt %, about 30 wt %, about 25 wt %, about 20 wt %, about 10 wt %, or about 5 wt %. In a particular embodiment, zinc is present in an amount less than about 25 wt %. In some cases, the composition additionally comprises at least one fourth metal type in an amount up to about 50 wt %, about 40 wt %, about 30 wt %, about 20 wt %, about 10 wt %, about 5 wt %, or less. In some cases, the composition may be associated with an electrode (e.g., via electrodeposition, using a binder, etc.).

In addition to the metal or metal oxide components, the composition may also include additional elements or compounds due to the particular method utilized for preparing the electrode. Such additional materials may be present in amounts of up to about 50% based on the total weight of the composition.

One aspect of the invention involves the discovery that an catalytic material (e.g., comprising a first, second, and/or third metal type) comprised in an electrode can be formulated such that the electrode may be operated in the presence of anionic species, which otherwise would have been expected to significantly affect the operation and/or stability of the electrode, with essentially no or little effect on the efficiency, stability, and/or operation of the electrode, whereas many electrodes (e.g. comprising a catalytic material) are unstable and/or do not operate efficiency in the presence of the anionic species. In a specific embodiment, an electrode comprising the catalytic material may be used for catalytically forming hydrogen gas in association with an electrochemical reaction (e.g., electrolysis of water), and for use with an electrolyte comprising an anionic species that facilitates the electrochemical reaction. In some cases, the anionic species assists the formation, operation, and/or stability of a catalytic material associated with the counter electrode (e.g., the electrode at which oxygen gas is produced via the electrolysis of water). Accordingly, in one set of embodiments, an catalytic material is selected such that it comprises at least a first metal type, a second metal type, and a third metal type where the second metal type is selected to moderate or eliminate any adverse effects associated with the presence of the anionic species, leading to increased efficiency, stability, and/or output of the electrode comprising the catalytic material as compared to many known electrodes under certain conditions of operation.

The first, second, and third metal types can each include one or more metal elements. For example, the first metal type may include one metal element, two metal elements, three metal elements, four metal elements, or more. A catalytic material comprising a first, second, and third metal type includes at least three metal elements, or includes more than three metal elements (e.g., four, five, six, seven, or more, metal elements). As a specific example, in one embodiment, the first metal type includes two metal elements, the second metal type includes one metal element, and the third metal type includes one metal element. Thus, the catalytic material in this embodiment includes four metal elements. Optionally, other metals or metal types can be included in the catalytic material, or used with the catalytic material, which do not serve the purpose of the metals or metal types suggested for a particular embodiment of the invention, so long as those metals or metal types that are suggested for such use are present.

Selection of the first, second, and third metal types will now be described in detail. In some embodiments, the first metal type may be selected to be capable of catalyzing the formation hydrogen gas (e.g., from protons and electrons) and/or oxidizing hydrogen gas (e.g., forming protons and electrons from hydrogen gas). The second metal type may be selected so as to prevent deposition of material comprising an anionic species on the electrode. For example, the second metal type may have an association constant of less than about $1 \times 10^{-3}$ $M^{-1}$, less than about $1 \times 10^{-2}$ $M^{-1}$, less than $1 \times$ about $10^{-1}$ $M^{-1}$, less than about 1 $M^{-1}$, less than about 10 $M^{-1}$, less than about $1 \times 10^2$ $M^{-1}$, less than about $1 \times 10^3$ $M^{-1}$, less than about $1 \times 10^4$ $M^{-1}$, less than $1 \times 10^5$ about $M^{-1}$, etc., with the anionic species. The third metal type may be selected to increase the surface area of the catalytic material (e.g., as described herein).

Metal elements suitable for use as the first metal type are metal elements which are capable of forming of hydrogen gas (e.g., from water) and/or for oxidizing hydrogen gas (or other oxidation reaction, as described herein). Those of ordinary skill in the art will be aware of metal elements which are capable of carrying out the selected metal reaction. Non-limiting examples of metal elements suitable to be used as a first metal type for forming hydrogen gas and/or for oxidizing hydrogen gas include Ni, Co, Fe, Cu, Mo, W, Rh, Ru, Os, Jr, Pt, Pd. In embodiments where the electrochemical reaction is a reaction other than the electrolysis of water, the first metal type is capable of catalyzing the formation of a product from a reaction, via electrolysis.

In some cases, however, metal elements suitable for use as the second metal type may be selected such that the metal element has an association constant of less than about $1 \times 10^{-3} M^{-1}$, less than about $1 \times 10^{-2}$ $M^{-1}$, less than $1 \times$ about $10^{-1}$ $M^{-1}$, less than about 1 $M^{-1}$, less than about 10 $M^{-1}$, less than about $1 \times 10^2$ $M^{-1}$, less than about $1 \times 10^3$ $M^{-1}$, less than about $1 \times 10^4$ $M^{-1}$, less than $1 \times 10^5$ about $M^{-1}$, etc., with an anionic species that is used in connection with an electrochemical reaction. In some cases, the anionic species is present to assist in the formation of, the stability of, and/or the operation of a catalytic material associated with the counter electrode. The catalytic material may assist in a portion of the electrochemical reaction at the counter electrode, for example, catalytic oxygen production. In some cases, the counter electrode comprises a current collector and a catalytic material comprising metal ionic species and anionic species. For example, the catalytic material may comprise anionic species from catalysts shown to be suitable for oxygen evolution from water for example as described in U.S. Patent Publication No. 2010/0101955, published Apr. 29, 2010, entitled "Catalytic Materials, Electrodes, and Systems for Water Electrolysis and Other Electrochemical Techniques," by Nocera, et al.; U.S. Patent Publication No. 2010/0133110, published Jun. 2, 2010, entitled "Catalytic Materials, Photoanodes, and Photoelectrochemical Cells For Water Electrolysis and Other Electrochemical Techniques," by Nocera, et al.; and/or U.S. Patent Publication No. 2010/0133111, published Jun. 2, 2010, entitled "Catalytic Materials, Photoanodes, and Photoelectrochemical Cells For Water Electrolysis and Other Electrochemical Techniques," by Nocera, et al., herein incorporated by reference. In one set of embodiments, the anionic species comprises phosphorus and/or boron and the metal anionic species includes cobalt ions and/or nickel ions.

Those of ordinary skill in the art will be aware of combinations of suitable second metal types and anionic species which have an association constant of less than $10^3$ $M^{-1}$. In one set of embodiments, metal elements suitable for use as the second metal type include metal elements which have an association constant of less than $1 \times 10^{-3} M^{-1}$, less than $1 \times 10^{-1}$ $M^{-1}$, less than $1 \times 10^2$ $M^{-1}$, less than $1 \times 10^3$ $M^{-1}$, less than $1 \times 10^5$ $M^{-1}$ and the like, with the anionic species that is used in connection with an electrochemical reaction and is in highest concentration in the electrolyte. In another set of embodiments, metal elements suitable for use as the second metal type include those which have an association constant of less than $10^3$ $M^{-1}$ with any anionic species which, alone or with other anionic species, defines at least about 20%, or at least about 40%, or at least about 60%, or at least about 80%, or at least about 90% of all anionic species present in the electrolyte. In another set of embodiments, hydroxide ions and/or oxide ions are excluded from the group of "anionic species" in relation to which an association constant of the second metal type is measured. The anionic species may be provided at a concentration of at least about 0.05 M, or at least about 0.1M, or at least about 0.2 M, or at least about 0.3 M, or at least about 0.4 M, or at least about 0.5 M, or at least about 0.6 M, or at least about 0.7 M, or at least about 0.8 M, or at least about 0.9 M, or at least about 1 M, or at least about 1.5 M, or at least about 2 M, or greater.

In some cases, the anionic species is selected from the group comprising forms of phosphate, forms of sulphate, forms of carbonate, forms of arsenate, forms of phosphite, forms of silicate, or forms of borate. In a particular embodiment, the anionic species comprises phosphorus or boron. Non-limiting examples of anionic species comprising phosphorus include $H_3PO_4$, $H_2PO_4^-$, $HPO_4^{-2}$, $PO_4^{-3}$, $H_3PO_3$, $H_2PO_3^-$, $HPO_3^{-2}$, $PO_3^{-3}$, $R^1PO(OH)_2$, $R^1PO_2(OH)^-$, $R^1PO_3^{-2}$, or the like, wherein $R^1$ is H, an alkyl, an alkenyl, an alkynyl, a heteroalkyl, a heteroalkenyl, a heteroalkynyl, an aryl, or a heteroaryl, all optionally substituted. In a particular embodiment, the anionic species is $HPO_4^{-2}$. Non-limiting examples of metal elements which have a low association constant with phosphate include Zn, Cd, Sn, In, Pb, Sb, Te, and Bi.

In some cases, the anionic species may be a polyanion. The term polyanion is given its ordinary meaning in the art and refers to an anion a molecule or chemical complex having more than one negative charges at more than one site.

In some cases, the second metal type may be selected based upon knowledge of hard/soft chemistry, as will be understood by those of ordinary skill in the art. In some cases, the second metal type may include hard metal element(s) and the anionic species may be a soft anion, or the second metal type may include soft metal elements(s) and the anionic species may be a hard anion. Generally, hard ions/atoms are smaller and relatively non-polarizable and soft ions/atoms are larger and more polarizable, as will be understood by those of ordinary skill in the art. Interactions between hard metal elements/soft anionic species or soft metal elements/hard anionic species are generally weaker than interactions between hard metal elements/hard anionic species or soft metal elements/soft anionic species. Accordingly, soft/hard chemistry can be used by those of ordinary skill in the art to recognize combinations of metal elements/anion species which may weakly interact, and thus, generally have low association constants. In some cases, the interaction may be determined based on the metal being in an oxidized state, and not in a ground state (e.g., $(M)^{n+}$, wherein n is 1, 2, 3, 4, etc.). Non-limiting examples of soft metal elements include Cd, Hg, Ag, Au, Pd, and Pt. Non-limiting examples of hard metal elements include Li, Na, K, Mg, Ca, Sr, Al, and Cr. Non-limiting examples of soft anionic species include $Se^{-2}$, $S^{-2}$ and $CN^-$. Non-limiting examples of hard anionic species include $OR^-$, $CO_3^-$, $CO_3^{-2}$, $NO_3^-$, $NO_2^-$, $ClO_4^{-2}$, $B(OH)_4^-$, $B_4O_7^{-2}$, $SO_4^{-2}$, $H_2PO_4^-$, $HPO_4^{-2}$, $PO_4^{-3}$, and $OH^-$.

It should be understood, that while in many embodiments, the catalytic material of the present invention comprises a second metal type which functions to provide a low association constant with a particular anionic species as described herein, this is by no means limiting, and in some cases, the second metal type does not necessarily function in this way, including in embodiments where an anionic species is not present. For example, in embodiments where the alloy is used for an oxidizing reaction (e.g., oxidation of hydrogen gas), the anionic species may not be present in solution, and thus, the second metal type may need not have a particular association constant with a particular anionic species. In such embodiments, the metal element suitable for use as the second metal type may be any metal element which is capable of forming a catalytic material with the first metal type and the third metal type.

Metal elements suitable for the third metal type include metals selected to increase the surface area of the catalytic material. For example, in some embodiments, the third metal type may be capable of de-alloying and/or otherwise being partially or fully removed from the alloy or metal mixture under certain conditions selected for the formation and/or operation of the electrode.

In some embodiments, the third metal type may increase surface area through a mechanism involving the third metal type at least partially dissolving during and/or after the inclusion of the third metal type into the catalytic material. For example, a third metal type may increase surface area due it the effect of the third metal type on the other metal types comprised in the catalytic material. That is, in some cases, the presence of a third metal type may cause the catalytic material to re-orient or re-structure upon or after the inclusion of the third metal type into the catalytic material. Such a re-orientation may includes, but is not limited to, the formation of agglomerates, nodules, precipitates, phase separated structures, and the like. The mechanisms involved can include, but are not limited to, inducing repulsive interactions among species in the catalytic material, surface segregation of one species, dissolution of a species from the catalytic material, and the like. A metal may segregate to the surface due to its repulsion and/or attraction to a substrate, support and/or to one of the other metal types contained in the catalytic material. A third metal type may be incorporated into a catalytic material, in some embodiments, due to its repulsion and/or attraction with another species contained in the catalytic material, leaving other species in the catalytic material at the surface, which can subsequently interact to enhance surface area through various mechanisms described above. These various mechanisms may occur via one step or multi-step processes in series or in parallel and to various extents of completion.

As will be understood by one of ordinary skill in the art, "de-alloying" as used herein refers to the selective removal of one element from a mixture of metals (e.g., catalytic material) by a suitable process, including corrosion processes. De-alloying of one or more of the metal elements from an alloy may increase the surface area of the alloy, thus allowing for greater access for the electrolyte or reactant to active surfaces or areas of the alloy/electrode.

De-alloying may take place prior to and/or during an electrochemical reaction. In some cases, the third metal type is selected such that at least 1%, at least about 2%, at least about 5%, at least about 10%, at least about 20%, at least about 30%, at least about 40%, at least about 50%, or more, of the third metal is de-alloyed. In some cases, the percent of the third metal type which has de-alloyed may be determined when a point of equilibrium of the de-alloying process has occurred. That is, following formation and/or operation of the electrode under select conditions, the percent de-alloyed may be determined when the current density (or other measurable parameter) of the electrode comprising the alloy has neither decreased nor increased by more than about 1%, or about 2%, or about 3%, or about 5%, or about 10%, or about 20%, or about 25%, or about 30%, or more, over a time period of about 5 minutes, or about 10 minutes, or about 30 minutes, or about 1 hour, or about 2 hours, or about 4 hours, or more, under essentially constant electrochemical conditions.

The amount of the third metal type de-alloyed may be determined using methods as will be known to those of ordinary skill in the art. For example, the amount de-alloyed may be determined using x-ray photoelectron spectroscopy (XPS) or energy dispersive X-ray spectroscopy (EDX). In some cases, the percentage de-alloyed may determine for the portion of the alloy in which the technique is capable of probing. For example, XPS is capable of determining the elemental composition of the first about 1 nm to about 10 nm of the surface of the catalytic material. In some embodiments, the portion of the catalytic material analyzed to determine the percentage of the third metal type de-alloyed is the first about 1 nm, about 2 nm, about 5 nm, about 10 nm, about 20 nm, about 50 nm, about 100 nm, or more, of the catalytic material.

In a particular embodiment, the percent of the third metal type may be determined as follows. An electrode can be formed by associating a catalytic material with a current collector using techniques described herein (e.g., electroplating of the alloy on the current collector). The catalytic material can be analyzed using XPS or EDX spectroscopy to determine the percentage of each the metal elements of the first, second, and third metal types included in the catalytic material. The third metal type can be de-alloyed under select conditions, as described herein. In some cases, the third metal type is de-alloyed until equilibrium is reached (e.g., as described herein, for example, where the current density of the electrode does not increase or decrease by more than 10% over a 2 hour period). The XPS or EDX analysis can then be repeated, thereby determining the amount of the third metal type de-alloyed.

Those of ordinary skill in the art will be aware of suitable methods for de-alloying a metal element from an alloy. In some cases, the de-alloying may be performed using chemical de-alloying techniques. For example, an alloy may be exposed to a solution (e.g., comprising a strong acid and/or mineral acid) for a period of time wherein the solution components are selected to specifically de-alloy the third metal type. In other cases, the third metal type may be de-alloyed by application of a voltage to the electrode. For example, the third metal type may be selected to have a lower electrochemical potential(s) as compared to the elements included for the first metal type and the second metal type, under select conditions. The applied potential difference may drive the de-alloying of the third metal type as compared to the first metal type and the second metal type, as will be understood by one of ordinary skill in the art.

As will be understood by those of ordinary skill in the art, in some cases, a portion of the elements included for the first metal type and the second metal type may also de-alloy from the alloy. In some cases, however, the selection of the first, second, and third metal types are such that the percent of third metal type that de-alloys from the alloy is at least about 2 times, at least about 3 times, at least about 5 times, at least about 10 times, at least about 20 times, at least about 30 times, at least about 50 times, or more, than the total amount of the first metal type and the second metal type. In some cases, the third metal type is selected to de-alloy from the alloy under set conditions at least about 2 times, or at least about 5 times, or at least about 10 times, or at least about 20 times, or at least about 50 times, the rate of any de-alloying of M' and M'' under the conditions. Non-limiting examples of the third metal types include V, Cr, Mo, W, Mn, Ca, Mg, Si, Zn, Al, Ag, and Se.

The alloy may be associated with the current collector using any suitable techniques as will be known by those of ordinary skill in the art. In some embodiments, the alloy can be associated with the current collector by electrodeposition in a suitable electroplating solution or bath. Electrodeposition techniques and methods will be known to those of ordinary skill in the art. For example, in some cases, the current collector may be immersed in a solution comprising one or more precursors comprising the metals to be comprised in the alloy. A voltage may be applied to the current collector, thereby causing an alloy to form and be associated with the current collector. For example, a solution may be provided comprising a nickel salt and a molybdenum salt, and a voltage may be applied to the current collector. Other non-limiting methods include vapor deposition, thermal deposition, plasma spraying, flame spraying, hot dipping methods, or mechanical plating. In some cases, the alloy may be first formed, then associated with a current collector. For example, a salt of the first, second, and/or third metal types may be provided in a solution (optionally comprising a substrate which may aid in precipitation) and a reducing agent, wherein the alloy is formed in the solution (e.g., associated with the substrate, if present; as a suspension and/or particulate matter; etc.). The solid material may be associated with a current collector (e.g., with use of a binder, etc.).

Prior to forming the alloy on the current collector using a plating bath, the current collector may be cleaned to ensure good adhesion of the coating. Methods and techniques for cleaning are conventional and well known in the art. For example, vapor degreasing, sand or grit blasting, polishing, and/or sonication may be utilized, the current collector may be etched in an acidic solution or cathodically cleaned in a caustic solution, or the current collector may be conditioned by the application of positive voltage, initiating oxidative chemistry, followed by the application of a negative voltage, initiating reductive chemistry. After cleaning, the current collector may be immersed in a plating bath to deposit the alloy on the current collector.

In some embodiments, an electrode of the present invention may comprise a current collector and a molecular catalyst or a metal coating associated with the current collector. It should be understood that while much of the application herein focuses on electrodes comprising a current collector and an alloy, this is by no means limiting, and the electrodes may instead comprise a current collector and a molecular catalyst or a metal coating, as described herein.

In some embodiments, a molecular catalyst may be an oxide such as a polyoxometallates (e.g., comprising SiWO). Polyoxometalates (POMs) are a class of inorganic metal-oxygen clusters. They generally comprise a polyhedral cage structure or framework bearing at least one negative charge which may be balanced by cations that are external to the cage. The framework of a polyoxometalate generally comprises a plurality of metal atoms, which can be the same or different, bonded to oxygen atoms. The POM may also contain centrally located heteroatom(s) surrounded by the cage framework. Non-limiting examples of classes of POMs which will be known to those of ordinary skill in the art include Keggin-type POMs (e.g., $[XM_{12}O_{40}]^{n-}$), Dawson-type POMs (e.g., $[X_2M_{18}O_{62}]^{n-}$), Lindqvist-type POMs (e.g., $[M_6O_{19}]^{n-}$), and Anderson-type POMs (e.g., $[XM_6O_{24}]^{n-}$) where X is a heteroatom, n is the charge of the compound, M is a metal (e.g., Mo, W, V, Nb, Ta, Co, Zn, etc., or combinations thereof), and O is oxygen. Generally, suitable heteroatoms include, but are not limited to, phosphorus, antimony, silicon, boron, sulfur, aluminum, or combinations thereof. Those of ordinary skill in the art will be aware of other suitable molecular catalysts for the production of hydrogen gas from protons and electrons. Other non-limiting examples of molecular catalysts include Co(diglyoxime) complexes, $[Ni(diphosphine)_2]^{2+}$ complexes, and metal porphyrin complexes (e.g., wherein the metal is Pd, Fe, Co, Pt, Ir, Ru, etc.). Non-limiting examples of metal coatings an electrode may comprise include Pt, Ni, Co, Fe, etc.

In one embodiment, a method of catalytically forming hydrogen gas, comprising providing an electrochemical device, comprising a first electrode, second electrode comprising a current collector and an alloy or a molecular catalyst associated with the current collector, and water, wherein the water comprises at least one additive and/or at least one impurity, and wherein the pH of the water is between about 6 and about 10. In some cases, the electrochemical system catalyzes the production of hydrogen gas, wherein hydrogen gas is produced with an absolute value of the overpotential of less than about 0.3 V at a current density of at least about 1 mA/cm$^2$, or any range described herein. In some cases, the current density of the electrode decreases by no more than about 10% over a period of 4 hours under essentially constant electrochemical conditions.

In some embodiments, a system for catalytically forming hydrogen gas in association with an electrochemical reaction, and for use with an electrolyte comprising an anionic species that facilitates the electrochemical reaction, the system including an electrode comprising a catalytic alloy comprises a first metal type, selected to be capable of catalyzing the formation hydrogen gas, a second metal type, selected to have an association constant of less than $10^3$ $M^{-1}$ with the anionic species so as to prevent deposition of material comprising the anionic species on the electrode, and a third metal type, selected to de-alloy from the alloy under set conditions so as to increase the surface area of the electrode exposable to the electrolyte.

In some cases, a method of catalytically forming hydrogen gas comprises providing an electrochemical device comprising an electrolyte comprising an anionic species at a concentration of at least 0.1 M, a first electrode. and a second electrode comprising a current collector and a catalytic alloy comprising a first metal type, a second metal type, and a third metal type, wherein the first metal type is capable of catalyzing the formation hydrogen gas, the second metal type has an association constant with the anionic species of less than $10^3$ $M^{-1}$, and the third metal type is capable of de-alloying under set conditions. The system may catalyze the formation of hydrogen gas from water, wherein the current density of the electrode decreases by no more than about 10% over a period of 4 hours under essentially constant electrochemical conditions.

Described above are various aspects of the invention generally, and other aspects of the compositions, electrodes, systems, and methods will now be described in more detail, including information regarding the formation of the electrodes, characteristics, and other properties and components of the compositions, methods, and systems.

In some embodiments, an electrode of the present invention comprising a current collector and an alloy (or molecular catalyst or metal coating) associated with the current collector. A "current collector," as used herein, is given two alternative definitions. In a typical arrangement of the invention, an alloy is associated with a current collector which is connected to an external circuit for application of voltage and/or current to the current collector, for receipt of power in the form of electrons produced by a power source, or the like. Those of ordinary skill in the art will understand the meaning of current collector in this context. More specifically, the current collector refers to the material between the alloy and the external circuit, through which electric current flows during a reaction of the invention or during formation of the electrode. Where a stack of materials are provided together including both an anode and a cathode, and one or more alloys associated with the cathode and/or anode, where current collectors may be separated by membranes or other materials, the current collector of each electrode (e.g., anode and/or cathode) is that material through which current flows to or from the alloy and external circuitry connected to the current collector. In the case of a current collector thus far described, the current collector will typically be an object, separate from the external circuit, easily identifiable as such by those of ordinary skill in the art. The current collector may comprise more than one material, as described herein. In another arrangement, a wire connected to an external circuit may, itself, define the current collector. For example, a wire connected to external circuitry may have an end portion on which is absorbed an alloy for contact with a solution or other material for electrolysis. In such a case, the current collector is defined as that portion of the wire on which alloy is absorbed.

"Electrolysis," as used herein, refers to the use of an electric current to drive an otherwise non-spontaneous chemical reaction. For example, in some cases, electrolysis may involve a change in redox state of at least one species and/or formation and/or breaking of at least one chemical bond, by the application of an electric current. Electrolysis of water, as provided by the invention, can involve splitting water into oxygen gas and hydrogen gas, or oxygen gas and another hydrogen-containing species, or hydrogen gas and another oxygen-containing species, or a combination. In some embodiments, devices of the present invention are capable of catalyzing the reverse reaction. That is, a device may be used to produce energy from combining hydrogen and oxygen gases (or other fuels) to produce water.

In some cases, an alloy may associate with the current collector via formation of a bond, such as an ionic bond, a covalent bond (e.g., carbon-carbon, carbon-oxygen, oxygen-silicon, sulfur-sulfur, phosphorus-nitrogen, carbon-nitrogen, metal-oxygen, or other covalent bonds), a hydrogen bond (e.g., between hydroxyl, amine, carboxyl, thiol, and/or similar functional groups), a dative bond (e.g., complexation or chelation between metal ions and monodentate or multidentate ligands), Van der Waals interactions, and the like. "Association" of a catalytic material with the current collector would be understood by those of ordinary skill in the art based on this description.

An alloy associated with a current collector will most often be arranged with respect to the current collector so that it is in sufficient electrical communication with the current collector to carry out purposes of the invention as described herein. "Electrical communication," as used herein, is given its ordinary meaning as would be understood by those of ordinary skill in the art whereby electrons can flow between the current collector and the alloy in a facile enough manner for the electrode to operate as described herein. That is, charge may be transferred between the current collector and the alloy. "Electrical communication" includes such communication through electrodes or other elements of an overall system that have internal resistivities.

In some cases, a catalytic material may be in "direct electrical communication" with a current collector (or a photoactive material). "Direct electrical communication," as used herein, is given its ordinary meaning as defined above with respect to electrical communication, but in this instance, the current collector and the catalytic material are in direct contact with one another (e.g., as opposed to through a secondary material, through use of circuitry, etc.). In some embodiments, an alloy and the current collector may be integrally connected. The term "integrally connected," when referring to two or more objects or materials, means objects and/or materials that do not become separated from each other during the course of normal use, e.g., separation requires at least the intentional separation of the objects and/or material, for example, including the use of tools. In some embodiments, a catalytic material may be in "indirect electrical communication" with a current collector (or photoactive material). That is, a material and/or circuitry may be interposed between the catalytic material and the current collector.

In some embodiments, an electrode (e.g., comprising a current collector and an alloy) may be characterized in terms of performance. One way of doing this, among many, is to compare the current density of the electrode versus the current collector alone. Typical current collectors are described more fully below and can include platinum, and the like. The current collector may be able to function, itself, as an electrode in water electrolysis, and may have been used in the past to do so. So, the current density during water electrolysis (where the electrode produces hydrogen gas from protons and electrons), using the current collector, as compared to essentially identical conditions (with the same counter electrode, same electrolyte, same external circuit, same water source, etc.), using the electrode including both current collector and the alloy may be compared. In most cases, the current density of the electrode will be greater than the current density of the current collector alone, where each is tested independently under essentially identical conditions. For example, the current density of the electrode may exceed the current density of the current collector by a factor of at least about 10, about 100, about 1000, about $10^4$, about $10^5$, about $10^6$, about $10^8$, about $10^{10}$, and the like. In a particular case, the difference in the current density is at least about $10^5$. In some embodiments, the current density of the electrode may exceed the current density of the current collector by a factor between about $10^4$ and about $10^{10}$, between about $10^5$ and about $10^9$, or between about $10^4$ and about $10^8$. The current density may either be the geometric current density or the total current density, as described herein.

The alloy may be porous, substantially porous, non-porous, and/or substantially non-porous. The pores may comprise a range of sizes and/or be substantially uniform in size. In some cases, the pores may or might not be visible using imaging techniques (e.g., scanning electron microscope). The pores may be open and/or closed pores. In some cases, the pores may provide pathways between the bulk electrolyte surface and the surface of the current collector.

The physical structure of the alloy may vary. For example, the alloy may be a film and/or particles associated with at least a portion of the current collector (e.g., surface and/or pores) that is immersed in the solution. In some embodiments, the alloy might not form a film associated with the current collector. In some cases, the alloy may define the surface of the current collector (e.g., all or essentially all of the surface of the current collector comprising the alloy. Alternatively or in addition, the alloy may be deposited or otherwise associated with a current collector as patches, islands, or some other pattern (e.g., lines, spots, rectangles), or may take the form of dendrimers, nanospheres, nanorods, or the like. A pattern in some cases can form spontaneously upon deposition of the alloy onto the current collector and/or can be patterned onto a current collector by a variety of techniques known to those of ordinary skill in the art (lithographically, via microcontact printing, etc.). Further, a current collector may be patterned itself such that certain areas facilitate association of the alloy while other areas do not, or do so to a lesser degree, thereby creating a patterned arrangement of alloy on the current collector as the electrode is formed. Where an alloy is patterned onto an electrode, the pattern might define areas of alloy and areas completely free of alloy, or areas with a particular amount of alloy and other areas with a different amount of alloy. The alloy may have an appearance of being smooth and/or bumpy. In some cases, the alloy may comprise cracks, as can be the case when the material is dehydrated.

In some cases, the thickness of alloy may be of substantially the same throughout the material. In other cases, the thickness of the alloy may vary throughout the material (e.g., a film does not necessarily have uniform thickness). The thickness of the alloy may be determined by determining the thickness of the material at a plurality of areas (e.g., at least 2, at least 4, at least 6, at least 10, at least 20, at least 40, at least 50, at least 100, or more areas) and calculating the average thickness. Where thickness of an alloy is determined via probing at a plurality of areas, the areas may be selected so as not to specifically represent areas of more or less alloy present based upon a pattern. Those of ordinary skill in the art will easily be able to establish a thickness-determining protocol that accounts for any non-uniformity or patterning of alloy on the surface. For example, the technique might include a sufficiently large number of area determinations, randomly selected, to provide overall average thickness. The average thickness of the alloy may be at least about 10 nm, at least about 100 nm, at least about 300 nm, at least about 500 nm, at least about 700 nm, at least about 1 um (micrometer), at least about 2 um, at least about 5 um, at least about 1 mm, at least about 1 cm, and the like. In some cases, the average thickness of the alloy may be less than about 1 mm, less than about 500 um, less than about 100 um, less than about 10 um, less than about 1 um, less than about 100 nm, less than about 10 nm, less than about 1 nm, less than about 0.1 nm, or the like. In some instances, the average thickness of the alloy may be between about 1 mm and about 0.1 nm, between about 500 um and about 1 nm, between about 100 um and about 1 nm, between about 100 um and about 0.1 nm, between about 0.2 um and about 2 um, between about 200 um and about 0.1 um, or the like. In particular embodiments, the alloy may have an average thickness of less than about 0.2 um. In another embodiment, the alloy may have an average thickness between about 0.2 um and about 2 um.

In some cases, an electrode may be used to form hydrogen gas from water for at least about 1 hour, at least about 2 hours, at least about 4 hours, at least about 8 hours, at least about 12 hours, at least about 1 day, at least about 2 days, at least about 3 days, at least about 4 days, at least about 1 week, at least about 2 weeks, at least about 1 month, at least about 2 months, at least about 3 months, at least about 6 months, at least about 1 year, at least about 18 months, at least about 2 years, at least about 3 years, at least about 5 years, at least about 10 years, or greater, with less than 50%, less than 40%, less than 30%, less than 20%, less than 10%, less than 5%, less than 3%, less than 2%, less than 1%, or less, change in a selected performance measure (e.g., overpotential at a specific current density, rate of production of oxygen at a fixed cell voltage, etc.).

Those of ordinary skill in the art will be aware of systems and methods for determining a selected performance measurement. The methods may be conducted under standard conditions (e.g., room temperature, atmosphere pressure, etc.). In some cases, an electrode of the present invention (e.g., comprising a current collector and an alloy or molecular catalyst, for hydrogen evolution) is at least partially immersed in a selected electrolyte (e.g., 1 M potassium phosphate solution having a pH of around 7, or 1 M potassium borate solution having a pH of about 9.2). The current collector may comprise a Pt rotating ring disk electrode. The system may also comprise a Ag/AgCl reference electrode and a Pt wire counter electrodes. The electrode for hydrogen evolution may be rotated at a particular rate (e.g., about 500 rpm about 1000 rpm, about 1500 rpm, about 2000 rpm, about 2500 rpm, about 3000 rpm, about 3500 rpm, etc.) and a potential may be applied to electrode. In a particular case, the electrode is rotated at a rate of about 2000 rpm. The desired performance parameter may be determined under these working conditions. In some cases, the applied potential may be described as an overpotential for the hydrogen evolution reaction. The overpotential may be defined as the potential ($E_{cathode}$) applied to an electrode in addition to the thermodynamic potential for the reaction of interest. In the case of hydrogen evolution, the thermodynamic potential for hydrogen evolution is 0.0 V vs. NHE, and thus the overpotential (ii) may be determined from the equation:

$$\eta = E_{cathode}(\text{vs. } NHE) - 0.0 \text{ V}$$

Figure 6A:
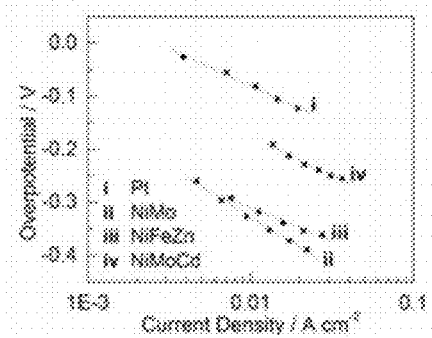
FIG. 6 shows Tafel plots of freshly prepared Pt, NiMo, NiFeZn, and NiMoCd hydrogen evolution catalysts in (A) 1 M KBi, pH 9.2 and (B) 1 M KPi, pH 7 electrolytes.
Figure 6B:
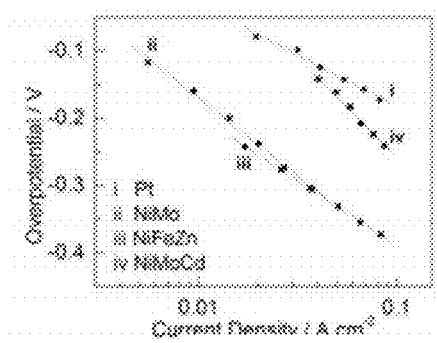

As an example of a performance parameter that may be determined, the current density may be measured at the rotating electrode as the overpotential is varied between zero and a selected voltage. The resulting data may be plotted as overpotential versus the log of the current density (i.e., a Tafel plot). For example, see FIGS. 6A and 6B, and the related example. It is generally desirable to form electrodes which operate at a lower (less negative) overpotential at a given current density.

Figure 7A:
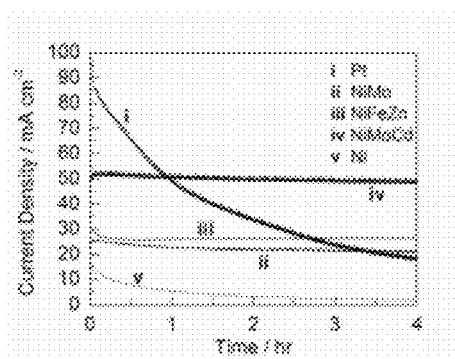
FIG. 7 shows bulk electrolyses plots of Pt, Ni, NiMo, NiFeZn and NiMoCd in (A) 1 M KPi, pH 7 and (B) 1 M KBi, pH 9.2 electrolytes.
Figure 7B:
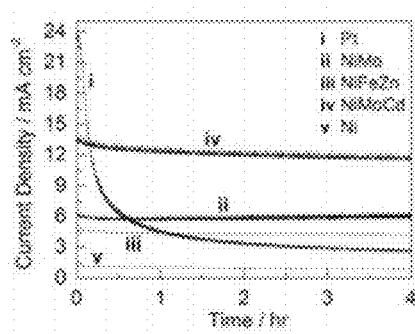

As another example, the stability of an electrode may be determined using a similar experimental setup as described above. The hydrogen-evolving electrode may be rotated at a rate of about 2500 rpm. A selected overpotential (e.g., about −0.1 V, about −0.2 V, about −0.3 V, about −0.4 V, etc.) may be applied to the electrode and the resulting current density can be measured as a function of time. For example, see FIGS. 7A and 7B, and the related example. In a particular embodiment, the overpotential is set at about −0.3 V. Generally, an electrode with increased stability exhibits smaller changes in electrode current density as the reaction time proceeds as compared to a less stable electrode.

The current collector may comprise a single material or may comprise a plurality of materials, provided that at least one of the materials is substantially electrically conductive. In some cases, the current collector may comprise a single material, for example, TTO, platinum, FTO, nickel, conductive carbon mesh and/or felt, or the like. In other cases, the current collector may comprise at least two materials. In some instances, the current collector may comprise a core material and at least one material substantially covers the core material. In other instances, the current collector may comprise two materials, wherein the second material may be associated with a portion of the first material (e.g., may be located between the first material and the alloys). The materials may be substantially non-conductive (e.g., insulating) and/or substantially conductive. As a non-limiting example, the current collector may comprise a substantially non-conductive core material and an outer layer of substantially conductive material (e.g., a core material may comprise vicor glass and the vicor glass may be substantially covered (e.g., coated with a layer) of a substantially conductive material (e.g., ITO, FTO, etc.)). Non-limiting examples of non-conductive core materials include inorganic substrates, (e.g., quartz, glass, etc.) and polymeric substrates (e.g., polyethylene terephthalate, polyethylene naphthalate, polycarbonate, polystyrene, polypropylene, etc.). As another example, the current collector may comprise a substantially conductive core material and a substantially conductive or substantially non-conductive material. In some cases, at least one of the materials is a membrane material, as will be known to those of ordinary skill in the art. For example, a membrane material may allow for the conductivity of protons or hydroxide ions, in some cases.

Non-limiting examples of substantially conductive materials the current collector may comprise includes indium tin oxide (ITO), fluorine tin oxide (FTO), antimony-doped tin oxide (ATO), aluminum-doped zinc oxide (AZO), glassy carbon, carbon mesh, metals, metal alloys, lithium-containing compounds, metal oxides (e.g., platinum oxide, nickel oxide, zinc oxide, tin oxide, vanadium oxide, zinc-tin oxide, indium oxide, indium-zinc oxide), graphite, zeolites, and the like. Non-limiting examples of suitable metals the current collector may comprise (including metals comprised in metal alloys and metal oxides) include iron, gold, copper, silver, platinum, ruthenium, rhodium, osmium, iridium, nickel, cadmium, tin, lithium, chromium, calcium, titanium, aluminum, cobalt, zinc, vanadium, nickel, palladium, tungsten, or the like, and combinations thereof (e.g., alloys such as palladium silver, steel, and/or stainless steel).

The current collector may also comprise other metals and/or non-metals known to those of ordinary skill in the art as conductive (e.g., ceramics, conductive polymers). In some cases, the current collector may comprise an inorganic conductive material (e.g., copper iodide, copper sulfide, titanium nitride, etc.), an organic conductive material (e.g., conductive polymer such as polyaniline, polythiophene, polypyrrole, etc.), and laminates and/or combinations thereof. In some cases, the current collector may comprise a semiconductor material.

In some instances, the current collector may comprise metals such as nickel (e.g., nickel foam or nickel mesh). Nickel foam and nickel mesh materials will be known to those of ordinary skill in the art and may be purchase from commercial sources. Nickel mesh usually refers to woven nickel fibers. Nickel foam generally refers to a material of non-trivial thickness (e.g., about 2 mm) comprising a plurality of holes and/or pores. In some cases, nickel foam may be an open-cell, metallic structure based on the structure of an open-cell polymer foam, wherein nickel metal is coated onto the polymer foam. Other types of foam materials will be known to those to ordinary skill in the art and may be used an a current collector. Non-limiting examples of materials a foam current collector may comprise include titanium, cupper, niobium, zirconium, titanium, tantalum, and stainless steel The current collector may be transparent, semi-transparent, semi-opaque, and/or opaque. The current collector may be solid, semi-porous, and/or porous. The current collector may be substantially crystalline or substantially non-crystalline, and/or homogenous or heterogeneous.

In some embodiments, the current collector (prior to addition of any alloy) and/or the alloy may have a high surface area. In some cases, the surface area of the current collector may be greater than about 0.01 $m^2/g$, greater than about 0.05 $m^2/g$, greater than about 0.1 $m^2/g$, greater than about 0.5 $m^2/g$, greater than about 1 $m^2/g$, greater than about 5 $m^2/g$, greater than about 10 $m^2/g$, greater than about 20 $m^2/g$, greater than about 30 $m^2/g$, greater than about 50 $m^2/g$, greater than about 100 $m^2/g$, greater than about 150 $m^2/g$, greater than about 200 $m^2/g$, greater than about 250 $m^2/g$, greater than about 300 $m^2/g$, or the like. In other cases, the surface area of the current collector may be between about 0.01 $m^2/g$ and about 300 $m^2/g$, between about 0.1 $m^2/g$ and about 300 $m^2/g$, between about 1 $m^2/g$ and about 300 $m^2/g$, between about 10 $m^2/g$ and about 300 $m^2/g$ between about 0.1 $m^2/g$ and about 250 $m^2/g$, between about 50 $m^2/g$ and about 250 $m^2/g$, or the like. In some cases, the surface area of the current collector may be due to the current collector comprising a highly porous material. The surface area of a current collector and/or alloy may be measured using various techniques, for example, optical techniques (e.g., optical profiling, light scattering, etc.), electron beam techniques, mechanical techniques (e.g., atomic force microscopy, surface profiling, etc.), electrochemical techniques (e.g., cyclic voltammetry, etc.), etc., as will be known to those of ordinary skill in the art.

The porosity of a current collector (or other component, for example, an electrode) may be measured as a percentage or fraction of the void spaces in the current collector. The percent porosity of a current collector may be measure using techniques known to those of ordinary skill in the art, for example, using volume/density methods, water saturation methods, water evaporation methods, mercury intrusion porosimetry methods, and nitrogen gas adsorption methods. In some embodiments, the current collector may be at least about 10% porous, at least about 20% porous, at least about 30% porous, at least about 40% porous, at least about 50% porous, at least about 60% porous, or greater. The pores may be open pores (e.g., have at least one part of the pore open to an outer surface of the electrode and/or another pore) and/or closed pores (e.g., the pore does not comprise an opening to an outer surface of the electrode or another pore). In some cases, the pores of a current collector may consist essentially of open pores (e.g., the pores of the current collector are greater than at least 70%, greater than at least 80%, greater than at least 90%, greater than at least 95%, or greater, of the pores are open pores). In some cases, only a portion of the current collector may be substantially porous. For example, in some cases, only a single surface of the current collector may be substantially porous. As another example, in some cases, the outer surface of the current collector may be substantially porous and the inner core of the current collector may be substantially non-porous. In a particular embodiment, the entire current collector is substantially porous.

The current collector may be made highly porous and/or comprise a high surface area using techniques known to those of ordinary skill in the art. For example, an ITO current collector may be made highly porous using etching techniques. As another example, vicor glass may be made highly porous using etching technique followed by substantially all the surfaces of the vicor glass being substantially coated with a substantially conductive material (e.g., ITO, FTO, etc.). In some cases, the material that substantially coats a non-conductive core may comprise a film or a plurality of particles (e.g., such that they form a layer substantially covering the core material).

In some cases, the current collector may comprise a core material, wherein at least a portion of the core material is associated with at least one different material. The core material may be substantially or partially coated with at least one different material. As a non-limiting example, in some cases, an outer material may substantially cover a core material, and an alloy may be associated with the outer material. The outer material may allow for electrons to flow between the core material and the alloy, the electrons being used by the alloy, for example, for the production of hydrogen gas from water. Without wishing to be bound by theory, the outer material may act as a membrane and allow electrons generated at the core material to be transmitted to the alloy. The membrane may also function by reducing and/or preventing hydrogen gas formed at the alloy from being transversed through the material. This arrangement may be advantageous in devices where the separation of oxygen gas and hydrogen gas formed from the oxidation of water is important. In some cases, the membrane may be selected such that the production of hydrogen gas in/at the membrane is limited.

The current collector may or may not be substantially planar. For example, the current collector may comprise ripples, waves, dendrimers, spheres (e.g., nanospheres), rods (e.g., nanorods), a powder, a precipitate, a plurality of particles, and the like. In some embodiments, the surface of the current collector may be undulating, wherein the distance between the undulations and/or the height of the undulations are on a scale of nanometers, micrometers, millimeters, centimeters, or the like. In some instances, the planarity of the current collector may be determined by determining the roughness of the current collector. As used herein, the term "roughness" refers to a measure of the texture of a surface (e.g., current collector), as will be known to those of ordinary skill in the art. The roughness of the current collector may be quantified, for example, by determining the vertical deviations of the surface of the current collector from planar. Roughness may be measured using contact (e.g., dragging a measurement stylus across the surface such as a profilometers) or non-contact methods (e.g., interferometry, confocal microscopy, electrical capacitance, electron microscopy, etc.). In some cases, the surface roughness, $R_a$, may be determined, wherein $R_a$ is the arithmetic average deviations of the surface valleys and peaks, expressed in micrometers. The $R_a$ of a non-planar surface may be greater than about 0.1 um, greater than about 1 um, greater than about 5 um, greater than about 10 um, greater than about 50 um, greater than about 100 um, greater than about 500 um, greater than about 1000 um, or the like.

The solution may be formed from any suitable material. In most cases, the solution may be a liquid and may comprise water. In some embodiments the solution consists of or consists essentially of water, i.e. it may be essentially pure water or an aqueous solution that behaves essentially identically to pure water, in each case, with the minimum electrical conductivity necessary for an electrochemical device to function. In some embodiments, the solution is selected such that the metal ionic species and the anionic species are substantially soluble. In some cases, when the electrode is to be used in a device immediately after formation, the solution may be selected such that it comprises water (or other fuel) to be oxidized by a device and/or method as described herein. For example, in instances where hydrogen gas is to be formed from water, the solution may comprise water (e.g., provided from a water source).

In some cases, the pH of the solution may be about neutral. That is, the pH of the solution may be between about 6.0 and about 8.0, between about 6.5 and about 7.5, and/or the pH is about 7.0. In other cases, the pH of the solution is about neutral or acidic. In these cases, the pH may be between about 0 and about 8, between about 1 and about 8, between about 2 and about 8, between about 3 and about 8, between about 4 and about 8, between about 5 and about 8, between about 0 and about 7.5, between about 1 and about 7.5, between about 2 and about 7.5, between about 3 and about 7.5, between about 4 and about 7.5, or between about 5 and about 7.5. In yet other cases, the pH may be between about 6 and about 10, between about 6 and about 11, between about 7 and about 14, between about 2 and about 12, and the like. In some embodiments, the pH of the solution may be about neutral and/or basic, for example, between about 7 and about 14, between about 8 and about 14, between about 8 and about 13, between about 10 and about 14, greater than 14, or the like. The pH of the solution may be selected such that the anionic species and the metal ionic species are in the desired state. For example, some anionic species may be affected by a change in pH level, for example, phosphate. If the solution is basic (greater than about pH 12), the majority of the phosphate is in the form $PO_4^{-3}$. If the solution is approximately neutral, the phosphate is in approximately equal amounts of the form $HPO_4^{-2}$ and the form $H_2PO_4^{-1}$. If the solution is slightly acidic (less than about pH 6), the phosphate is mostly in the form $H_2PO_4^-$. The pH level may also affect the solubility constant for the anionic species and the metal ionic species.

In some embodiments, an electrode as described herein may be capable of forming hydrogen gas from protons and electrons at a low absolute value of the overpotential. Voltage in addition to a thermodynamically determined reduction or oxidation potential that is required to attain a given activity is herein referred to as "overpotential," and may limit the efficiency of the electrolytic device. Overpotential is therefore given its ordinary meaning in the art, that is, it is the potential that must be applied to a system, or a component of a system such as an electrode to bring about an electrochemical reaction (e.g., formation of hydrogen gas from water) minus the thermodynamic potential required for the reaction. Those of ordinary skill in the art understand that the total potential that must be applied to a particular system in order to drive a reaction can typically be the total of the potentials that must be applied to the various components of the system. For example, the potential for an entire system can typically be higher than the potential as measured at, e.g., an electrode at which hydrogen gas is produced from the electrolysis of water. Those of ordinary skill in the art will recognize that where overpotential for hydrogen production from water electrolysis is discussed herein, this applies to the voltage required for the conversion of protons and electrons to hydrogen itself, and does not include voltage drop at the counter electrode (where it is assumed that water oxidation to oxygen and protons and electrons takes place, among possibly other reactions).

The thermodynamic potential for the production of hydrogen gas from protons and electrons generally varies depending on the conditions of the reaction (e.g., pH, temperature, pressure, etc.). Those of ordinary skill in the art will be able to determine the theoretical thermodynamic potential for the production of hydrogen gas from protons and electrons depending on the experimental conditions.

In some instances, an electrode as described herein may be capable of forming hydrogen gas from protons and electrons (e.g., gaseous and/or liquid water) with an absolute value of the overpotential being less than about 1 volt, less than about 0.75 volts, less than about 0.5 volts, less than about 0.4 volts, less than about 0.35 volts, less than about 0.325 volts, less than about 0.3 volts, less than about 0.25 volts, less than about 0.2 volts, less than about 0.15 volts, less than about 0.1 volts, less than about 0.075 volts or the like. In some embodiments, the absolute value of the overpotential is between about 0.1 volts and about 0.4 volts, between about 0.2 volts and about 0.4 volts, between about 0.25 volts and about 0.4 volts, between about 0.3 volts and about 0.4 volts, between about 0.25 volts and about 0.35 volts, between about 0.1 and about 0.2 volts, between about 0.1 and about 0.3 volts, or the like. In some cases, the absolute value of the overpotential of an electrode is determined under standardized conditions of an electrolyte with a neutral pH (e.g., about pH 7.0), ambient temperature (e.g., about 25° C.), ambient pressure (e.g., about 1 atm), a current collector that is non-porous and planar (e.g., an ITO plate), and at a geometric current density (as described herein) of about 1 mA/cm². It is to be understood that systems of the invention can be used under conditions other than those described immediately above and in fact those of ordinary skill in the art will recognize that a very wide variety of conditions can exist in use of the invention. But the conditions noted above are provided only for the purpose of specifying how features such as overpotential, amount of oxygen and/or hydrogen formed, and other performance characteristics defined herein are measured for purposes of clarity of the present invention. In a specific embodiment, an electrode may form hydrogen gas from protons and electrons at an absolute value of the overpotential of less than 0.3 volt, less than about 0.25 volts, less than about 0.2 volts, less than about 0.15 volts, or less than about 0.1 volts at an electrode current density of at least 1 mA/cm². In another embodiment, an electrode may form hydrogen gas from water at an absolute value of the overpotential of less than 0.3 volt, less than about 0.25 volts, less than about 0.2 volts, less than about 0.15 volts less than about 0.1 volts, or less than about 0.075 volts at an electrode current density of at least 10 mA/cm². In still yet another embodiment, an electrode may form hydrogen gas from water at an absolute value of the overpotential of less than about 0.3 volt, less than about 0.25 volts, less than about 0.2 volts, less than about 0.15 volts, or less than about 0.1 volts at an electrode current density of at least 100 mA/cm².

In some embodiments, an electrode may be capable of forming hydrogen gas from water (e.g., gaseous and/or liquid water) with a Faradaic efficiency of about 100%, greater than about 99.8%, greater than about 99.5%, greater than about 99%, greater than about 98%, greater than about 97%, greater than about 96%, greater than about 95%, greater than about 90%, greater than about 85%, greater than about 80%, greater than about 70%, greater than about 60%, greater than about 50%, etc. The term, "Faradaic efficiency," as used herein, is given its ordinary meaning in the art and refers to the efficacy with which charge (e.g., electrons) are transferred in a system facilitating a particular electrochemical reaction. Loss in Faradaic efficiency of a system may be caused, for example, by the misdirection of electrons which may participate in unproductive reactions, product recombination, short circuit the system, and other diversions of electrons and may result in the production of heat and/or chemical byproducts.

Faradaic efficiency may determined, in some cases, through bulk electrolysis where a known quantity of reagent is stoichiometrically converted to product as measured by the current passed and this quantity may be compared to the observed quantity of product measured through another analytical method. For example, a device or electrode may be used to form hydrogen gas from protons and electrons. The total amount of hydrogen gas formed may be measured using techniques know to those of ordinary skill in the art (e.g., using an hydrogen sensor, electrochemical methods, etc.). The total amount of hydrogen that is expected to be produced may be determined using simple calculations. The Faradaic efficiency may be determined by determining the percentage of hydrogen gas produced vs. the expected amount of hydrogen gas produced. In some cases, the Faradaic efficiency of an electrode changes by less than about 0.1%, less than about 0.2%, less than about 0.3%, less than about 0.4%, less than about 0.5%, less than about 1.0%, less than about 2.0%, less than about 3.0%, less than about 4.0%, less than about 5.0%, etc., over a period of operation of the electrode of about 1 day, about 2 days, about 3 days, about 5 days, about 15 days, about 1 month, about 2 months, about 3 months, about 6 months, about 12 months, about 18 months, about 2 years, etc.

In some embodiments, systems and/or devices may be provided that comprise an electrode described above and/or an electrode prepared using the above described methods. In particular, a device may be an electrochemical device (e.g., an energy conversion device). Non-limiting examples of electrochemical devices includes electrolytic devices, fuel cells, and regenerative fuel cells, as described herein. In some embodiments, the device is an electrolytic device. An electrolytic device may function as an oxygen gas and/or hydrogen gas generator by electrolytically decomposing water (e.g., liquid and/or gaseous water) to produce oxygen and/or hydrogen gases. An electrolytic device may function as an oxygen gas and/or hydrogen gas generator by electrolytically decomposing water (e.g., liquid and/or gaseous water) to produce oxygen and/or hydrogen gases. An energy conversion device, in some embodiments, may be used to provide at least a portion of the energy required to operate an automobile, a house, a village, a cooling device (e.g., a refrigerator), etc. In some embodiments, a device may be used to produce $O_2$ and/or $H_2$. The $O_2$ and/or $H_2$ may be converted back into electricity and water, for example, using a device such as a fuel cell. In some cases, however, the $O_2$ and/or $H_2$ may be used for other purposes (e.g., medical, industrial, and/or scientific purposes). Other non-limiting examples of device uses include $O_2$ production (e.g., gaseous oxygen), $H_2$ production (e.g., gaseous hydrogen), $H_2O_2$ production, ammonia oxidation, hydrocarbon (e.g., methanol, methane, ethanol, and the like) oxidation, exhaust treatment, etc.

In some embodiments, an electrolytic device for electrochemically forming oxygen and hydrogen gases from water and systems and methods associated with the same, may be provided. In one configuration, the device comprises a chamber, a first electrode, a second electrode (e.g., as described herein), wherein the first electrode is biased positively with respect to the second electrode, an electrolyte, wherein each electrode is in fluid contact with the electrolyte, a water source, and a power source in electrical communication with the first and the second electrode. In some cases, the water source may comprise at least one additive and/or at least one impurity. A first electrode may be considered biased negatively or positively towards a second electrode means that the first voltage potential of the first electrode is negative or positive, with respect to the second voltage potential of the second electrode. The second electrode may be biased negatively or positively with respect to the second electrode by less than about less than about 1.23 V (e.g., the minimum defined by the thermodynamics of transforming water into oxygen and hydrogen gases), less than about 1.3 V, less than about 1.4 V, less than about 1.5 V, less than about 1.6 V, less than about 1.7 V, less than about 1.8 V, less than about 2 V, less than about 2.5 V, and the like. In some cases, the bias may be between about 1.5 V and about 2.0 V, between about 2.0 and 2.5 V, between about 1.6 V and about 1.9 V, or is about 1.6 V.

Protons may be provided to the devices described herein using any suitable proton source, as will be known to those of ordinary skill in the art. The proton source may be any molecule or chemical which is capable of supplying a proton, for example, $H^+$, $H_3O^+$, $NH_4^+$, etc. A hydrogen source (e.g., for use as a fuel in a fuel cell) may be any substance, compound, or solution including hydrogen such as, for example, hydrogen gas, a hydrogen rich gas, natural gas, etc. The oxygen gas provided to a device may or may not be substantially pure. For example, in some cases, any substance, compound or solution including oxygen may be provided, such as, an oxygen rich gas, air, etc.

An example of an electrolytic device is depicted in FIG. 1. Power source 120 is electrically connected to first electrode 122 and second electrode 124, wherein the second electrode is an electrode as described herein. First electrode 122 and second electrode 124 are in contact with an electrolyte 162. In this example, electrolyte 126 comprises water. However, in some cases, a physical barrier (e.g., porous diaphragm comprised of asbestos, microporous separator of polytetrafluoroethylene (PTFE)), and the like may separate the electrolyte solution in contact with the first electrode from the electrolyte solution in contact with the second electrode, while still allowing ions to flow from one side to another. In other embodiments, the electrolyte might not be a solution and may be a solid polymer that conducts ions. In such cases, water may be provided to the device using any suitable water source.

In this non-limiting embodiment, the electrolytic device may be operated as follows. The power source may be turned on and electron-holes pairs may be generated. Holes 128 are injected into first electrode 122 and electrons 130 are injected into second electrode 124. At the first electrode, water is oxidized to form oxygen gas, four protons, and four electrons, as shown in the half reaction 132. At the second electrode, the electrons are combined with protons (e.g., from a proton source such as the electrolyte) to form hydrogen, as shown in the half reaction 134. There is a net flow of electrons from the first electrode to the second electrode. The oxygen and hydrogen gases formed may be stored and/or used in other devices, including fuel cells, or used in commercial or other applications.

In some embodiments, an electrolytic device may comprise a first electrochemical cell in electrical communication with a second electrochemical cell. The first electrochemical cell may comprise an electrode as described herein and may form oxygen and/or hydrogen gases from water. The electrons formed at the electrode during the formation of oxygen gas may be transferred (e.g., through circuitry) to the second electrochemical cell. The electrons may be used in the second electrochemical cell in a second reaction (e.g., for the production of hydrogen gas from hydrogen ions). In some embodiments, materials may be provided which allow for the transport of hydrogen ions formed in the first electrochemical cell to the second electrochemical cell. Those of ordinary skill in the art will be aware of configurations and materials suitable for such a device.

Figure 2:
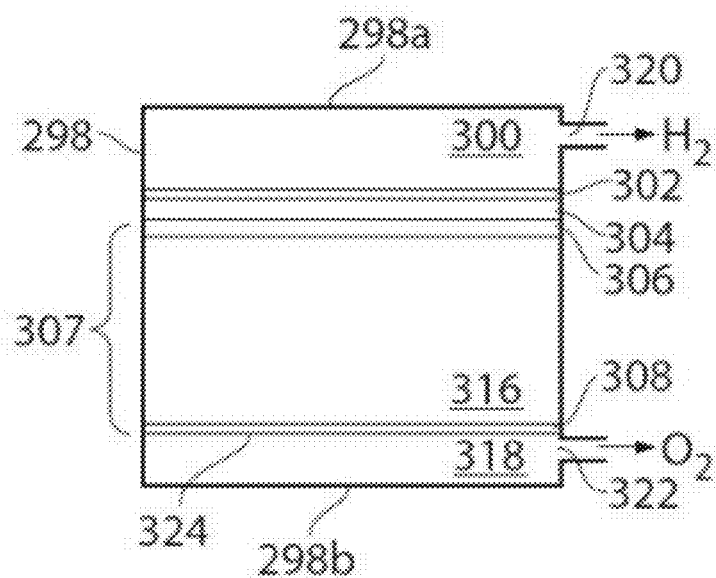
FIG. 2 shows a non-limiting example of an electrochemical device of the invention.

In some case, a device may comprise an electrode comprising an alloy associated with a current collector comprising a first material and a second material. For example, as shown in FIG. 2, a device may comprise housing 298, first outlet 320 and second outlet 322 for the collection of $O_2$ and $H_2$ gases formed during water oxidation, first electrode 302 and second electrode 307 (comprising first material 306, second material 316, and alloy 308). In some cases, material 304 may be present between first electrode 302 and second electrode 306 (e.g., a non-doped semiconductor). The device comprises an electrolyte (e.g., 300, 318). Second material 316 may be a porous electrically conductive material (e.g., valve metal, metallic compound) wherein the electrolyte (e.g., 318) fills the pores of the material. Without wishing to be bound by theory, material 316 may act as a membrane and allow for the transmission of electrons generated at first material 306 to outer surface 324 of second material 316. Second material 316 may also be selected such that no oxygen gas is produced in the pores of second material 316, for example, if the overpotential for production of oxygen gas is high. Oxygen gas may form on or near surface 324 of second material 316 (e.g., or via the alloy associated with outer surface 324 of second material 316). Non-limiting examples of materials which may be suitable for use as second material 316 includes titanium zirconium, vanadium, hafnium, niobium, tantalum, tungsten, or alloys thereof. In some cases, the material may be a valve metal nitride, carbide, borides, etc., for example, titanium nitride, titanium carbide, or titanium boride. In some cases, the material may be titanium oxide, or doped titanium oxide (e.g., with niobium tantalum, tungsten, fluorine, etc.).

In some cases, a fuel cell (or fuel-to-energy conversion device) and systems and methods associated with the same may be provided. A typical, conventional fuel cell comprises two electrodes, a first electrode and a second electrode, an electrolyte in contact with both the first and the second electrodes, and an electrical circuit connecting the first and the second electrodes from which power created by the device is drawn.

The construction and operation of a fuel cell will be known to those of ordinary skill in the art. Non-limiting examples of fuel cell devices which may comprise an electrode and/or catalytic material and include proton exchange membrane (PEM) fuel cells, phosphoric acid fuel cells, molten carbonate fuel cells, solid oxide fuel cells, alkaline fuel cells, direct methanol fuel cells, zinc air fuel cells, protonic ceramic fuel cells, and microbial fuel cells. In some embodiments, a device may be a regenerative fuel cell, using catalytic materials, electrodes, or devices as described herein. A regenerative fuel cell is a device that comprises a fuel cell and an electrolytic device.

In some embodiments, a device may be a regenerative fuel cell, using electrodes or devices as described herein. A regenerative fuel cell is a device that comprises a fuel cell and an electrolytic device. The electrolytic device and the fuel cell may be defined primarily by the same components, which are operable either as an electrolytic or fuel cell, or one or both of the electrolytic device and the fuel cell can include components used only for that device but not the other. For example, the regenerative fuel cell may include a first electrode and a second electrode, where both the first and second electrode are used for both the electrolytic device and the fuel cell, depending upon the availability and setting of electrical potential, fuel, etc. As another example, the regenerative fuel cell may include an electrolytic cell defined by its own set of electrodes, electrolyte, compartment(s), and various connections, and a separate fuel cell defined by its own electrodes, etc., different from some or all of the components of the electrolytic cell). As an example of use, if the electrolytic device and the fuel cell are defined primarily by the same components, then when the device is functioning as an electrolytic device, oxygen and hydrogen gases can be produced from water using a set of at least two electrodes. The oxygen and hydrogen gases may be stored and then used as fuel when the device is functioning as a fuel cell, using those same electrodes, or using a least one of the same electrodes. In this arrangement, the system is substantially contained and may be used repeatedly.

In some embodiments, the electrodes and compositions described herein may be used in connection with a photovoltaic-assisted photoelectrochemical cell and/or a photoactive composition. In some cases, the photoactive composition is a photovoltaic cell, a triple-junction a-Si photovoltaic cell, a semiconductor, or a p-type semiconductor photocathode. Photoelectrochemical cells, devices, and related methods will be known to those of ordinary skill in the art. In some cases, the catalytic material may be directly associated with the photoactive composition (e.g., the catalytic material is in direct contact with the photoactive composition) or indirectly associated with the photoactive composition (e.g., the catalytic material is used in connection with a photoactive composition, but is not in direct contact with the catalytic material). For example, in one embodiment, the processes that may occur in a photovoltaic-assisted photoelectrochemical cell are as follows. A first electrode may be exposed to electromagnetic radiation, wherein the first electrode comprises a transparent conductive coating that has been applied to one side of a photovoltaic cell. A second electrode may be applied to the other side of the photovoltaic cell and may comprise a conductive layer interfaced with an alloy as described herein. Light may pass through the transparent coating and excite the photovoltaic cell underneath the first electrode, and may result in the formation of electronic charged carriers (e.g., electron/hole pairs). Water may be oxidized by the electron holes produced at the first electrode. The hydrogen ions produced at the first electrode may be transported (e.g., through the electrolyte) to the second electrode comprising the metal alloy hydrogen evolution catalysts described herein, and the electrons produced at the first electrode may be transferred to the second electrode through the photovoltaic cell. The transported hydrogen ions (e.g., $H^+$ or another form such as $H_2PO_4^-$) may be reduced with transported electrons at the second electrode, thereby forming hydrogen gas.

In one embodiment, the processes that may occur in a tandem photoanode-photovoltaic, photoelectrochemical cell are as follows. The first electrode may be exposed to electromagnetic radiation, wherein the first electrode comprises an n-type semiconductor and may be biased positively with respect to a second electrode. The light may excite the semiconducting material of the first electrode, and result in the formation of electronic charged carriers (e.g., electron/hole pairs). Water may be oxidized by the electron holes produced at the first electrode. The hydrogen ions produced at the first electrode may be transported (e.g., through the electrolyte) to the second electrode comprising the a metal alloy as described herein, and the electrons produced at the first electrode may be transferred to the second electrode through a circuit. The transported hydrogen ions (e.g., $H^+$ or another form such as $H_2PO_4^-$) may be reduced with transported electrons at the second electrode, thereby forming hydrogen gas.

Photoactive compositions will be known to those of ordinary skill in the art. Non-limiting examples of photoactive materials include $TiO_2$, $WO_3$, $SrTiO_3$, $TiO_2$—Si, $BaTiO_3$, $LaCrO_3$—$TiO_2$, $LaCrO_3$—$RuO_2$, $TiO_2$—$In_2O_3$, GaAs, GaP, p-GaAs/n-GaAs/pGa$_{0.2}$In$_{0.48}$P, AlGaAs/SiRuO$_2$, PbO, $FeTiO_3$, $KTaO_3$, $MnTiO_3$, $SnO_2$, $Bi_2O_3$, $Fe_2O_3$ (including hematite), ZnO, CdS, $MoS_2$, CdTe, CdSe, CdZnTe, ZnTe, HgTe, HgZnTe, HgSe, ZnTe, ZnS, HgCdTe, HgZnSe, etc., or composites thereof. In some cases, the photoactive composition may be doped. For example, $TiO_2$ may be doped with Y, V, Mo, Cr, Cu, Al, Ta, B, Ru, Mn, Fe, Li, Nb, In, Pb, Ge, C, N, S, etc., and $SrTiO_3$ may be doped with Zr. The photoactive composition may be provided in any suitable morphology or arrangement, for example, including single crystal wafers, coatings (e.g., thin films), nanostructured arrays, nanowires, etc. Those of ordinary skill in the art will be aware of methods and techniques for preparing a photoactive composition in a chosen form. For example, doped $TiO_2$ may be prepared by sputtering, sol-gel, and/or anodization of Ti. In an exemplary embodiment, the photoactive composition may comprise alpha-$Fe_2O_3$, also known as hematite, optionally doped.

In some embodiments, an electrochemical system and/or device as described herein (e.g., for electrolysis of water) may be operated at a voltage where the voltage of the system is primarily maintained at any one of the overpotentials described herein. That is, in such a system, the overpotential may be maintained at a constant level at one of the levels or within one of the ranges described herein, but need not be. The potential of the system can be adjusted during use, linearly, nonlinearly, in a stepwise fashion, or the like. But in some cases, the system is run at an overpotential or within an overpotential range described herein for at least about 25%, at least about 45%, at least about 60%, at least about 80%, at least about 90%, at least about 95%, or at least 98%, of the time the system is operative. In one embodiment, the voltage is held at such overpotential for essentially 100% of the time the system and/or device is operative. This means that the system can be held at the stated overpotential but moved outside of that level or range for periods of time during use but, in accordance with this aspect of the invention, not more than one of the stated time percentages above.

The performance of an electrode of a device may be measured by current density (e.g., geometric and/or total current density), wherein the current density is a measure of the density of flow of a conserved charge. For example, the current density is the electric current per unit area of cross section. In some cases, the current density (e.g., geometric current density and/or total current density, as described herein) of an electrode as described herein is greater than about 0.1 mA/cm$^2$, greater than about 1 mA/cm$^2$, greater than about 5 mA/cm$^2$, greater than about 10 mA/cm$^2$, greater than about 20 mA/cm$^2$, greater than about 25 mA/cm$^2$, greater than about 30 mA/cm², greater than about 50 mA/cm², greater than about 100 mA/cm², greater than about 200 mA/cm², and the like.

In some embodiments, the current density can be described as the geometric current density. The geometric current density, as used herein, is current divided by the geometric surface area of the electrode. The geometric surface area of an electrode will be understood by those of ordinary skill in the art and refers to the surface defining the outer boundaries of the electrode (or current collector), for example, the area that may be measured by a macroscopic measuring tool (e.g., a ruler) and does not include the internal surface area (e.g., area within pores of a porous material such as a foam, or surface area of those fibers of a mesh that are contained within the mesh and do not define the outer boundary, etc.).

In some embodiments, the current density can be described as the geometric current density. The geometric current density, as used herein, is current divided by the geometric surface area of the electrode. The geometric surface area of an electrode will be understood by those of ordinary skill in the art and refers to the surface defining the outer boundaries of the electrode (or current collector), for example, the area that may be measured by a macroscopic measuring tool (e.g., a ruler) and does not include the internal surface area (e.g., area within pores of a porous material such as a foam, or surface area of those fibers of a mesh that are contained within the mesh and do not define the outer boundary, etc.).

In some embodiments, a device and/or electrode as described herein is capable of forming at least about 1 umol (micromole), at least about 5 umol, at least about 10 umol, at least about 20 umol, at least about 50 umol, at least about 100 umol, at least about 200 umol, at least about 500 umol, at least about 1000 umol oxygen and/or hydrogen, or more, per cm² at the electrode at which oxygen production or hydrogen production occurs, respectively, per hour. The area of the electrode may be the geometric surface area or the total surface area, as described herein.

In some cases, an electrolytic device may be constructed and arranged to be electrically connectable to and able to be driven by the photovoltaic cell (e.g., the photovoltaic cell may be the power source for the device for the electrolysis of water). Photovoltaic cells comprise a photoactive material which absorbs and converts light to electrical energy. Those of ordinary skill in the art will understand the meaning of a device "constructed and arranged to be electrically connectable and able to be driven by" a photovoltaic cell. This arrangement involves a photovoltaic cell, and electrolysis device, which are clearly indicated for connection to each other through packaging, written instructions, unique connective features (mechanical and/or electrical), or the like. In this or other embodiments, the two (photovoltaic cell and electrolysis device) can be packaged together as a kit. The electrolytic device may include any of the electrodes or devices as described herein. Photovoltaic cells, and methods and systems providing the same, will be known to those of ordinary skill in the art. In some cases, with use of an electrode as described herein, electrolysis of water may proceed at a rate of production of at least about 1 umol (micromole), at least about 5 umol, at least about 10 umol, at least about 20 umol, at least about 50 umol, at least about 100 umol, at least about 200 umol, at least about 500 umol, at least about 1000 umol oxygen and/or hydrogen gases per cm² of photovoltaic cell per hour. In a particular embodiment, a device comprising a photovoltaic device and an electrolytic device as described herein may be able to produce at least about 10 umol oxygen and/or hydrogen gases per cm² of photovoltaic cell per hour.

The devices and methods as described herein, in some cases, may proceed at about ambient conditions. Ambient conditions define the temperature and pressure relating to the device and/or method. For example, ambient conditions may be defined by a temperature of about 25° C. and a pressure of about 1.0 atmosphere (e.g., 1 atm, 14 psi). In some cases, the conditions may be essentially ambient. Non-limiting examples of essentially ambient temperature ranges include between about 0° C. and about 40° C., between about 5° C. and about 35° C., between about 10° C. and about 30° C., between about 15° C. and about 25° C., at about 20° C., at about 25° C., and the like. Non-limiting examples of essentially ambient pressure ranges include between about 0.5 atm and about 1.5 atm, between about 0.7 atm and about 1.3 atm, between about 0.8 and about 1.2 atm, between about 0.9 atm and about 1.1 atm, and the like. In a particular case, the pressure may be about 1.0 atm. Ambient or essentially ambient conditions can be used in conjunction with any of the devices, compositions, catalytic materials, and/or methods described herein, in conjunction with any conditions (for example, conditions of pH, etc.).

Figure 3:
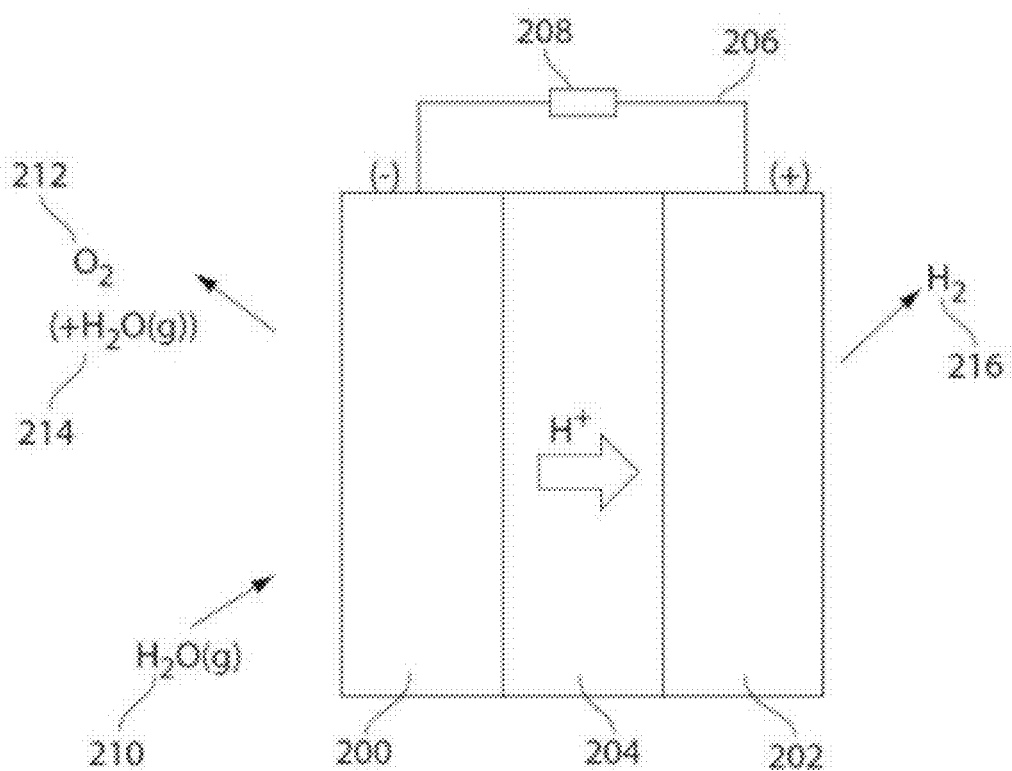
FIG. 3 illustrates a non-limiting example of an electrolytic device employing water in a gaseous state.

In some embodiments, the water provided and/or formed during use of a method and/or device as described herein may be in a gaseous state. Those of ordinary skill in the art can apply known electrochemical techniques carried out with steam, in some cases, without undue experimentation. As an exemplary embodiment, water may be provided in a gaseous state to an electrolytic device (e.g., high-temperature electrolysis or steam electrolysis) comprising an electrode in some cases. In some cases, the gaseous water to be provided to a device may be produced by a device or system which inherently produces steam (e.g., a nuclear power plant). The electrolytic device, in some cases, may comprise a first and a second porous electrodes (e.g., electrode as described herein, nickel-cermet steam/hydrogen electrode, mixed oxide electrode (e.g., comprising lanthanum, strontium, etc., cobalt oxygen electrodes, etc.) and an electrolyte. The electrolyte may be non-permeable to selected gases (e.g., oxygen, oxides, molecular gases (e.g., hydrogen, nitrogen, etc.)). Non-limiting examples of electrolytes include yttria-stabilized zirconia, barium-stabilized zirconia, etc. A non-limiting example of one electrolytic device that may use water in a gaseous state is shown in FIG. 3. An electrolytic device is provided which comprises first electrode 200, second electrode 202, non-permeable electrolyte 204, power source 208, and circuit 206 connecting first electrode and second electrode, wherein second electrode 202 is biased positively with respect to first electrode 200. Gaseous water 210 is provided to first electrode 200. Oxygen gas 212 is produced at the first electrode 200, and may sometimes comprise gaseous water 214. Hydrogen gas 216 is produced at second electrode 202. In some embodiments, steam electrolysis may be conducted at temperatures between about 100° C. and about 1000° C., between about 100° C. and about 500° C., between about 100° C. and about 300° C., between about 100° C. and about 200° C., or the like. Without wishing to be bound by theory, in some cases, providing water in a gaseous state may allow for the electrolysis to proceed more efficiently as compared to a similar device when provided water in a liquid state. This may be due to the higher input energy of the water vapor. In some instances, the gaseous water provided may comprise other gases (e.g., hydrogen gas, nitrogen gas, etc.).

Individual aspects of the overall electrochemistry and/or chemistry involved in electrochemical devices such as those described herein are generally known, and not all will be described in detail herein. It is to be understood that the specific electrochemical devices described herein are exemplary only, and the components, connections, and techniques as described herein can be applied to virtually any suitable electrochemical device including those with a variety of solid, liquid, and/or gaseous fuels, and a variety of electrodes, and electrolytes, which may be liquid or solid under operating conditions (where feasible; generally, for adjacent components one will be solid and one will be liquid if any are liquids). It is also to be understood that the electrochemical device unit arrangements discussed are merely examples of electrochemical devices that can make use of electrodes as recited herein. Many structural arrangements other than those disclosed herein, which make use of and are enabled as described herein, will be apparent to those of ordinary skill in the art.

An electrochemical device accordingly may be combined with additional electrochemical devices to form a larger device or system. In some embodiments, this may take the form of a stack of units or devices (e.g., fuel cell and/or electrolytic device). Where more than one electrochemical device is combined, the devices may all be devices as described herein, or one or more devices as described herein may be combined with other electrochemical devices, such as conventional solid oxide fuel cells. It is to be understood that where this terminology is used, any suitable electrochemical device, which those of ordinary skill in the art would recognize could function in accordance with the systems and techniques of the present invention, can be substituted.

As mentioned above, in some embodiments, the water may contain at least one impurity (e.g., a material, compound, chemical, etc., present naturally in the water source) and/or at least one additive (e.g., a material, compound, chemical, etc., purposely added to the water source). The presence of the at least one additive and/or the at least one impurity may have little or substantially no affect on the performance of the electrode. For example, in some cases, an electrode may be capable of operating at approximately the same, at greater than about 95%, at greater than about 90%, at greater than about 80%, at greater than about 70%, at greater than about 60%, at greater than about 50%, or the like, of the activity level using water containing at least one impurity or additive versus the activity using water that does not substantially contain the impurity or additive under essentially identical conditions. In some cases, the current density (or other performance parameter) of an electrode may decrease by no more than about 50%, about 40%, about 30%, about 20%, about 15%, about 10%, about 8%, about 5%, about 4%, about 3%, about 2%, about 1%, or less, over a time period of about 1 hour, about 2 hours, about 4 hours, about 8 hours, about 12 hours, about 18 hours, about 1 day, about 2 days, about 3 days, about 4 days, about 1 week, about 2 weeks, about 1 month, or more, under essentially constant electrochemical conditions. In some cases, the current density of the electrode decreases by no more than about 10% over a period of 4 hours under essentially constant electrochemical conditions.

The term "essentially constant electrochemical conditions" as used herein, refers to a set of conditions in which an electrode is operated for a period of time, wherein essentially no adjustments are made to the operation conditions. For example, no adjustments are made for specifically increasing or decreasing the performance of a system. However, it should be understood that changes in the conditions related to replenishing reactants and/or reagents that are consumed, when necessary, or inherent changes in the conditions due to operation of the system (e.g., an increase in temperature due to operation of the device), are considered to be encompassed by the term "essentially constant electrochemical conditions." Generally, for essentially constant conditions, the physical arrangement of the system and/or operating parameters are not altered during operation during the desired time period. For example, the voltage or current if one is held constant, the power input or output, the gas produced or consumed, component arrangement, materials, etc., are maintained in an essentially similar state during operation of the essentially constant conditions (e.g., no increase or decrease in the voltage/current applied to the system, no change in the arrangement of the system, etc.). In some cases, reactants and/or reagents may be consumed, and additional amounts of the reactants and/or reagents may be provided such that the concentration or other measurable parameter (e.g., pH) of the reactants and/or reagents remains essentially constant during operation (e.g., such that there is a change in the concentration of anionic species of less than about 0.01 M, less than about 0.03 M, less than about 0.05 M, less than about 0.1 M, less than about 0.2 M, less than about 0.3 M, etc.), when necessary. In some cases, the temperature of the system may increase or decrease during use due to inherent processes in the system (e.g., circuitry heating), and this is to be understood to be encompassed in the term "essentially constant conditions." However, a change in the temperature of the system due to exposure to an external heat source would not be considered encompassed by the term "essentially constant conditions."

Water may be provided to the systems, devices, electrodes, and/or for the methods described herein using any suitable source. In some cases, the water provided is from a substantially pure water source (e.g., distilled water, deionized water, chemical grade water, etc.). In some cases, the water may be bottled water. In some cases, the water may be provided is from a by a natural and/or impure water source (e.g., tap water, lake water, ocean water, rain water, river/stream water, lake water, pond water, sea water, potable water, brackish water, industrial process water, etc.). In some cases, the water is not purified prior to use (e.g., before being provided to the system/electrode for electrolysis). In some instances, the water may be filtered to remove particulates and/or other impurities prior to use. In some embodiments, the water that is electrolyzed to produce oxygen gas (e.g., using an electrode and/or device as described here) may be substantially pure. The purity of the water may be determined using one or more methods known to those of ordinary skill in the art, for example, resistivity, carbon content (e.g., through use of a total organic carbon analyzer), UV absorbance, oxygen-absorbance test, limulus ameobocyte lysate test, etc.

The at least one impurity or additive may be solid (e.g., particulate matter), a liquid, and/or a gas. In some cases, the impurity or additive may be solubilized and/or dissolved. For example, an impurity may comprise ionic species. In some cases, an impurity may be an impurity which may generally be present in a water source (e.g., tap water, non-potable water, potable water, sea water, etc.). In a particular embodiment, the water source may be sea water and one of the impurities may be chloride ions, as discussed more herein. In some cases, an impurity or additive may comprise a metal such as a metal element (including heavy metals), a metal ion, a compound comprising at least one metal, an ionic species comprising a metal, etc. For example, an impurity or additive comprising metal may comprise an alkaline earth metal, an alkali metal, a transition metal, or the like. Specific non-limiting examples of metals include lithium, sodium, magnesium, titanium, vanadium, chromium, manganese, iron, cobalt, nickel, copper, zinc, potassium, mercury, lead, barium, etc. In some cases, the impurity or additive may comprise organic materials, for example, organic molecules (e.g., bisphenol A, trimethylbenzene, dioxane, nitrophenol, etc.), microorganisms (such as bacteria (e.g., *e. coli*, coliform, etc.), microbes, fungi, algae, etc.), other biological materials, pharmaceutical compounds (e.g., drugs, decomposition products from drugs), herbicides, pyrogens, pesticides, proteins, radioactive compounds, inorganic compounds (e.g., compounds comprising boron, silicon, sulfur, nitrogen, cyanide, phosphorus, arsenic, sodium, etc.; carbon dioxide, silicates (e.g., $H_4SiO_4$), ferrous and ferric iron compounds, chlorides, aluminum, phosphates, nitrates, etc.), dissolved gases, suspended particles (e.g., colloids), or the like. In some cases, an impurity or additive may be a gas, for example, carbon monoxide, ammonia, carbon dioxide, oxygen gas, and/or hydrogen gas. In some cases, the gas impurity may be dissolved in the water. In some cases, an electrode may produce hydrogen from water containing at least one impurity such that less than about 5 mol %, less than about 3 mol %, less than about 2 mol %, less than about 1 mol %, less than about 0.5 mol %, less than about 0.1 mol %, less than about 0.01 mol % of the products produced comprise any portion of the at least one impurity.

In some cases, an impurity may be present in the water in an amount greater than about 1 ppt, greater than about 10 ppt, greater than about 100 ppt, greater than about 1 ppb, greater than about 10 ppb, greater than about 100 ppb, greater than about 1 ppm, greater than about 10 ppm, greater than about 100 ppm, greater than about 1000 ppm, or greater. In other cases, an impurity may be present in the water in an amount less than about 1000 ppm, less than about 100 ppm, less than about 10 ppm, less than about 1 ppm, less than about 100 ppb, less than about 10 ppb, less than about 1 ppb, less than about 100 ppt, less than about 10 ppt, less than about 1 ppt, or the like. In some cases, the water may contain at least one impurity, at least two impurities, at least three impurities, at least five impurities, at least ten impurities, at least fifteen impurities, at least twenty impurities, or greater. In some cases, the amount of impurity may increase or decrease during operation of the electrode and/or device. That is, an impurity may be formed during use of the electrode and/or device. For example, in some cases, the impurity may be a gas (e.g., oxygen gas and/or hydrogen gas) formed during the electrolysis of water. Thus, in some cases, the water may contain less than about 1000 ppm, less than about 100 ppm, less than about 10 ppm, less than about 1 ppm, less than about 100 ppb, less than about 10 ppb, less than about 1 ppb, less than about 100 ppt, less than about 10 ppt, less than about 1 ppt, or the like, of the impurity prior to operation of the electrode and/or device.

In some embodiments, the at least one impurity may be an ionic species. In some cases, when the water contains at least one ionic species, the water purity may be determined, at least in part, by measuring the resistivity of the water. The theoretical resistivity of water at 25° C. is about 18.2 MΩ·cm. The resistivity of water that is not substantially pure may be less than about 18 MΩ·cm, less than about 17 MΩ·cm, less than about 16 MΩ·cm, less than about 15 MΩ·cm, less than about 12 MΩ·cm, less than about 10 MΩ·cm, less than about 5 MΩ·cm, less than about 3 MΩ·cm, less than about 2 MΩ·cm, less than about 1 MΩ·cm, less than about 0.5 MΩ·cm, less than about 0.1 MΩ·cm, less than about 0.01 MΩ·cm, less than about 1000Ω·cm, less than about 500Ω·cm, less than about 100Ω·cm, less than about 10Ω·cm, or less. In some cases, the resistivity of the water may be between about 10 MΩ·cm and about 1Ω·cm, between about 1 MΩ·cm and about 10Ω·cm, between about 0.1 MΩ·cm and about 100Ω·cm, between about 0.01 MΩ·cm and about 1000Ω·cm, between about 10,000Ω·cm and about 1,000Ω·cm, between about 10,000Ω·cm and about 100Ω·cm, between about 1,000 and about 1Ω·cm, between about 1,000 and about 10Ω·cm, and the like. In some cases, when the water source is tap water, the resistivity of the water may be between about 10,000Ω·cm and about 1,000Ω·cm. In some cases, when the water source is sea water, the resistivity of the water may be between about 1,000Ω·cm and about 10Ω·cm. In some instances, where the water may be taken from an impure source and purified prior to use, the water may be purified in a manner which does not resistivity of the water by a factor of more than about 5%, about 10%, about 20%, about 25%, about 30%, about 50%, or the like. Those of ordinary skill in the art will be aware of methods to determine the resistivity of water. For example, the electrical resistance between parallel electrodes immersed in the water may be measured.

In some cases, where the water is obtained from an impure water source and/or has a resistivity of less than about 16 MΩ·cm the water may be purified (e.g., filtered) in a manner that changes its resistivity by a factor of less than about 50%, less than about 30%, less than about 25%, less than about 20%, less than about 15%, less than about 10%, less than about 5%, or less, after being drawn from the source prior to use in the electrolysis.

In some embodiments, the water may contain halide ions (e.g., fluoride, chloride, bromide, iodide), for example, such that an electrode may be used for the desalination of sea water. In some cases, the halide ions might not be oxidized (e.g., to form halogen gas such as $Cl_2$) during the production of hydrogen gas from water. In some cases, an electrode may catalytically produce hydrogen from water comprising halide ions such that less than about 5 mol %, less than about 3 mol %, less than about 2 mol %, less than about 1 mol %, less than about 0.5 mol %, less than about 0.1 mol %, less than about 0.01 mol % of the gases evolved comprise oxidized halide species. In some embodiments, the impurity is sodium chloride.

In some cases, the oxidation of water may dominate over the oxidation of halide ions (or other impurities) due to various factors include kinetics, solubility, and the like. For example, the binding affinity of an metal ionic species for an anionic species may be substantially greater than the binding affinity of the metal ionic species for a halide ion, such that the coordination sphere of the metal ionic species may be substantially occupied by the anionic species. Those of ordinary skill in the art will be able to determine if an electrode as described herein is able to produce hydrogen gas using water containing halide ions, for example, by monitoring the production of halogen gas (or species comprising oxidized halide ions) using suitable techniques, for example, mass spectrometry.

In some cases, the water source may comprise at least one additive (e.g., a compound or material purposely added to the water source). In some embodiments, the additive may be an anionic species. For example, in some cases, a device may comprise a first electrode comprising a current collector and an alloy and second electrode comprising a current collector and a catalytic material comprising at least one anionic species and at least one metal ionic species. The water source may comprise the at least one anionic species. In some cases, the electrolyte can comprise an anionic species which is different from the at least one anionic species comprised in the catalytic material. For example, the catalytic material may comprise phosphate anions and the electrolyte may comprise borate anions.

In some cases, when the additive is an anionic species, the electrolyte may comprise counter cations (e.g., when the anionic species is added as a complex, a salt, etc.). The anionic species may be good proton-accepting species. In some cases, the additive may be a good proton-accepting species which is not anionic (e.g., is a neutral base). Non-limiting example of good proton-accepting species which are neutral include pyridine, imidazole, and the like. The concentration of the additive or impurity in the water may be about or at least about 0.01 M, about 0.1 M, about 0.5 M, about 1 M, about 2 M, about 5 M, about 10 M, or the like, or between about 0.01 M and about 10 M, about 0.1 M and about 5 M, about 0.5 M and about 2 M, or the like. In some cases, the concentration of the at least one impurity in the water may be about or at least about 1 pM (picomolar), about 10 pM, about 100 pM, about 1 uM (micromolar), about 10 uM, about 100 uM, about 0.001 M, about 0.1 M, or greater.

In some cases, the additive (e.g., anionic species) may be able to accept and/or donate hydrogen ions, for example, $H_2PO_4^-$ or $HPO_4^{-2}$. Non-limiting examples of anionic species include forms of phosphate ($H_3PO_4^-$ or $HPO_4^{-2}$, $H_2PO_4^{-2}$ or $PO_4^{-3}$), forms of sulphate ($H_2SO_4$ or $HSO_4^-$, $SO_4^{-2}$), forms of carbonate ($H_2CO_3$ or $HCO_3^-$, $CO_3^{-2}$), forms of arsenate ($H_3AsO_4$ or $HAsO_4^{-2}$, $H_2AsO_4^{-2}$ or $AsO_4^{-3}$), forms of phosphite ($H_3PO_3$ or $HPO_3^{-2}$, $H_2PO_3^{-2}$ or $PO_3^{-3}$), forms of sulphite ($H_2SO_3$ or $HSO_3^-$, $SO_3^{-2}$), forms of silicate, forms of borate (e.g., $H_3BO_3$, $H_2BO_3^-$, $HBO_3^{-2}$, etc.), forms of nitrites, forms of nitrates, and the like. In some embodiments, the additive may act as a buffer (e.g., such that the pH of the water is between 6 and 10, or about neutral, or any other pH range described herein). In some embodiments, the additive is not a compound or material which causes the water to become basic (e.g., KOH, NaOH, etc.). That is, the additive does not cause the water to have a pH of about 10 or greater.

In some cases, the additive (e.g., anionic species) may be a form of phosphonate. A phosphonate is a compound comprising the structure $PO(OR^1)(OR^2)(R^3)$ wherein $R^1$, $R^2$, and $R^3$ can be the same or different and are H, an alkyl, an alkenyl, an alkynyl, a heteroalkyl, a heteroalkenyl, a heteroalkynyl, an aryl, or a heteroaryl, all optionally substituted, or are optionally absent (e.g., such that the compound is an anion, dianion, etc.). In a particular embodiment, $R^1$, $R^2$, and $R^3$ can be the same or different and are H, alkyl, or aryl, all optionally substituted. A non-limiting example of a phosphonate is a form of $PO(OH)_2R^1$ (e.g., $PO_2(OH)(R^1)^-$, $PO_3(R^1)^{-2}$), wherein $R^1$ is as defined above (e.g., alkyl such as methyl, ethyl, propyl, etc.; aryl such as phenol, etc.). In a particular embodiment, the phosphonate may be a form of methyl phosphonate ($PO(OH)_2Me$), or phenyl phosphonate ($PO(OH)_2Ph$). Other non-limiting examples of phosphorus-containing anionic species include forms of phosphinites (e.g., $P(OR^1)R^2R^3$) and phosphonites (e.g., $P(OR^1)(OR^2)R^3$) wherein $R^1$, $R^2$, and $R^3$ are as described above. In other cases, the anionic species may comprise one any form of the following compounds: $R^1SO_2(OR^2))$, $SO(OR^1)(OR^2)$, $CO(OR^1)(OR^2)$, $PO(OR^1)(OR^2)$, $AsO(OR^1)(OR^2)(R^3)$, wherein $R^1$, $R^2$, and $R^3$ are as described above. With respect to the anionic species discussed above, those of ordinary skill in the art will be able to determine appropriate substituents for the anionic species.

In some embodiments, the additive (e.g., anionic species) may be good proton-accepting species. As used herein, a "good proton-accepting species" is a species which acts as a good base at a specified pH level. For example, a species may be a good proton-accepting species at a first pH and a poor proton-accepting species at a second pH. Those of ordinary skill in the art can identify a good base in this context. In some cases, a good base may be a compound in which the $pK_a$ of the conjugate acid is greater than the $pK_a$ of the proton donor in solution. As a specific example, $SO_4^{-2}$ may be a good proton-accepting species at about pH 2.0 and a poor proton-accepting species at about pH 7.0. A species may act as a good base around the $pK_a$ value of the conjugate acid. For example, the conjugate acid of $HPO_4^{-2}$ is $H_2PO_4^-$, which has a $pK_a$ value of about 7.2. Therefore, $HPO_4^{-2}$ may act as a good base around pH 7.2. In some cases, a species may act as a good base in solutions with a pH level at least about 4 pH units, about 3 pH units, about 2 pH units, or about 1 pH unit, above and/or below the $pK_a$ value of the conjugate acid. Those of ordinary skill in the art will be able to determine at which pH levels an anionic species is a good proton-accepting species.

The anionic species may be provided as an anionic compound comprising the anionic species and a counter cation. The counter cation may be any cationic species, for example, a metal ion (e.g., $K^+$, $Na^+$, $Li^+$, $Mg^{+2}$, $Ca^{+2}$, $Sr^{+2}$), $NR_4^+$ (e.g., $NH_4^+$), $H^+$, and the like. In a specific embodiment, the anionic compound employed may be $K_2HPO_4$. In some embodiment, the additive may be provided from a commercial source. The commercial source may comprise at least one impurity (e.g., in the case of phosphate, potassium may be present), wherein the at least one impurity in the commercial source also have little or no substantially affect on the performance of the electrode.

Various components of a device, such as the electrodes, power source, electrolyte, separator, container, circuitry, insulating material, gate electrode, etc. can be fabricated by those of ordinary skill in the art from any of a variety of components, as well as those described in any of those patent applications described herein. Components may be molded, machined, extruded, pressed, isopressed, infiltrated, coated, in green or fired states, or formed by any other suitable technique. Those of ordinary skill in the art are readily aware of techniques for forming components of devices herein.

An electrolyte, as known to those of ordinary skill in the art is any substance containing free ions that is capable of functioning as an ionically conductive medium. In some cases, the electrolyte may be a liquid, a gel, and/or a solid. In some cases, an electrolyte may comprise water, which may act as the water source. In other embodiments, however, the electrolyte not comprise water, e.g., in embodiments where the electrolyte is a solid. The electrolyte may also comprise methanol, ethanol, sulfuric acid, methanesulfonic acid, nitric acid, mixtures of HCl, organic acids like acetic acid, etc. In some cases, the electrolyte may comprise mixtures of solvents, such as water, organic solvents, amines and the like. In some cases, the pH of the electrolyte (or water source) may be about neutral. That is, the pH of the electrolyte (or water source) may be between about 5.5 and about 8.5, between about 6.0 and about 8.0, about 6.5 about 7.5, and/or the pH is about 7.0. In a particular case, the pH is about 7.0. In other cases, the pH of the electrolyte is about neutral or acidic. In these cases, the pH may range from about 0 to about 8, about 1 to about 8, about 2 to about 8, about 3 to about 8, about 4 to about 8, about 5 to about 8, about 0 to about 7.5, about 1 to about 7.5, about 2 to about 7.5, about 3 to about 7.5, about 4 to about 7.5, about 5 to about 7.5. In yet other cases, the pH may be between about 6 and about 10, about 6 and about 11, about 7 and about 14, about 2 and about 12, and the like. In a specific embodiment, the pH is between about 6 and about 8, between about 5.5 and about 8.5, between about 5.5 and about 9.5, between about 5 and about 9, between about 3 and about 11, between about 4 and about 10, or any other combination thereof. In some cases, when the electrolyte is a solid, the electrolyte may comprise a solid polymer electrolyte. The solid polymer electrolyte may serve as a solid electrolyte that conducts cations or anions, such as protons and separate the gases produces and or utilized in the electrochemical cell.

Non-limiting examples of a solid polymer electrolyte are polyethylene oxide, polyacrylonitrile, cured or crosslinked polyacrylates and/or polyurethanes, and commercially available NAFION. Non-limiting embodiments of non-liquid electrolytes include electrolytes formed by using a lithium salt and an ion-conductive polymer such as polyethylene oxide or polypropylene oxide; gel polymer electrolytes formed by using a non-ionic conductive polymer such as poly(vinyl chloride), polyacrylonitrile, polymethyl methacrylate, poly(vinylidene fluoride), poly(vinyl) sulfone, or combinations thereof.

In some embodiments, the system may comprise an ion exchange membrane For example, anion exchange membranes and/or cation exchange membranes (i.e. ones with anion and/or cation exchangeable ions) may be used and are readily available from commercial sources (e.g., Tokuyama (Japan) or Fuma-Tech (Germany)—quaternary ammonium groups associated with a polymer). Non-limiting examples of anionic exchange membranes include poly(ethylene-co-tetrafluoroethylene), poly(hexafluoropropylene-co-tetrafluoroethylene), poly(epichlorhydrin-ally glycidyl ether), poly (ether imide), poly(ethersulfone) cardo, poly(2,6-dimethyl-1,4-phenylene oxide), polysulfone, or polyethersulfone, associated with a plurality of cationic species (e.g., quaternary ammonium groups, phosphonium groups, etc.).

In some cases, the electrolyte may be used to selectively transport one or more ionic species. In some embodiments, the electrolyte(s) are at least one of oxygen ion conducting membranes, proton conductors, carbonate ($CO_3^{-2}$) conductors, $OH^-$ conductors, and/or mixtures thereof. In some cases, the electrolyte(s) are at least one of cubic fluorite structures, doped cubic fluorites, proton-exchange polymers, proton-exchange ceramics, and mixtures thereof. Further, oxygen-ion conducting oxides that may be used as the electrolyte(s) include doped ceria compounds such as gadolinium-doped ceria ($Gd_{1-x}Ce_xO_{2-d}$) or samarium-doped ceria ($Sm_{1-x}Ce_xO_{2-d}$), doped zirconia compounds such as yttrium-doped zirconia ($Y_{1-x}Zr_x(O_{2-d})$) or scandium-doped zirconia ($Sc_{1-x}Zr_x(O_{2-d})$), perovskite materials such as $La_{1-x}Sr_xGa_{1-y}Mg_yO_{3-d}$, yttria-stabilized bismuth oxide, and/or mixtures thereof. Examples of proton conducting oxides that may be used as electrolyte(s) include, but are not limited to, undoped and yttrium-doped $BaZrO_{3-d}$, $BaCeO_{3-d}$, and $SrCeO_{3-d}$ as well as $La_{1-x}Sr_xNbO_{3-d}$.

In some cases, the electrolyte may be recirculated in the electrochemical device. That is, a device may be provided which is able to move the electrolyte in the electrochemical device. Movement of the electrolyte in the electrochemical device may help decrease the boundary layer of the electrolyte. The boundary layer is the layer of fluid in the immediate vicinity of an electrode. In general, the extent to which a boundary layer exists is a function of the flow velocity of the liquid in a solution. Therefore, if the fluid is stagnant, the boundary layer may be much larger than if the fluid was flowing. Therefore, movement of the electrolyte in the electrochemical device may decrease the boundary layer and improve the efficiency of the device.

In most embodiments, a device may comprise at least one electrode as described herein. In some instances, the device can comprise electrodes besides those as described herein. In some embodiments, a device may comprise an electrode comprising a current collector and a catalytic material (e.g., comprising cobalt ions and anionic species comprising phosphorus) associated with the current collector, for example, as described in U.S. Provisional Patent Application Ser. No. 61/073,701, filed Jun. 18, 2008, entitled "Catalyst Compositions and Electrodes for Photosynthesis Replication and Other Electrochemical Techniques," by Nocera, et al., U.S. Provisional Patent Application Ser. No. 61/084,948, filed Jul. 30, 2008, entitled "Catalyst Compositions and Electrodes for Photosynthesis Replication and Other Electrochemical Techniques," by Nocera, et al., U.S. Provisional Patent Application Ser. No. 61/103,879, filed Oct. 8, 2008, entitled "Catalyst Compositions and Electrodes for Photosynthesis Replication and Other Electrochemical Techniques," by Nocera, et al., U.S. Provisional Patent Application Ser. No. 61/146,484, filed Jan. 22, 2009, entitled "Catalyst Compositions and Electrodes for Photosynthesis Replication and Other Electrochemical Techniques," by Nocera, et al., U.S. Provisional Patent Application Ser. No. 61/179,581, filed May 19, 2009, entitled "Catalyst Compositions and Electrodes for Photosynthesis Replication and Other Electrochemical Techniques," by Nocera, et al., and U.S. patent application Ser. No. 12/486,694, filed Jun. 17, 2009, entitled "Catalytic Materials, Electrodes, and Systems for Water Electrolysis and Other Electrochemical Techniques," by Nocera, et al, herein incorporated by reference. The current collector may comprise the same or different materials as comprised in a current collector of an electrode for the production of hydrogen from water, as described herein.

In some embodiments, a power source may supply DC or AC voltage to an electrochemical device. Non-limiting examples include batteries, power grids, regenerative power supplies (e.g., wind power generators, photovoltaic cells, tidal energy generators), generators, and the like. The power source may comprise one or more such power supplies (e.g., batteries and a photovoltaic cell). In a particular embodiment, the power supply is a photovoltaic cell.

In some cases, electrochemical devices may comprise a separating membrane. The separating membranes or separators for the electrochemical device may be made of suitable material, for example, a plastic film. Non-limiting examples of plastic films included include polyamide, polyolefin resins, polyester resins, polyurethane resin, or acrylic resin and containing lithium carbonate, or potassium hydroxide, or sodium-potassium peroxide dispersed therein.

Where an electrode of the invention is used in connection with an electrochemical device such as a fuel cell, any suitable fuels, oxidizers, and/or reactants may be provided to the electrochemical devices. In a particular embodiment, the fuel is hydrogen gas which is reacted with oxygen gas to produce water as a product. However, other fuels and oxidants can be used. For example, a hydrocarbon gas, such as methane, may be used as a fuel to produce water and carbon dioxide as a product. Other hydrocarbon gases, such as natural gas, propane, hexane, etc., may also be used as fuel. Furthermore, these hydrocarbon materials may be reformed into a carbon containing fuel, such as carbon monoxide, or previously supplied carbon monoxide may also be used as fuel.

The following references are herein incorporated by reference: U.S. Provisional Patent Application Ser. No. 61/237,507, filed Aug. 27, 2009, entitled "Improved Methods and Compositions Involving Catalytic Materials, Electrodes, and Systems for Water Electrolysis and Other Electrochemical Techniques," by Esswein, et al., U.S. Provisional Patent Application Ser. No. 61/266,826, filed Dec. 4, 2009, entitled "Electrodes, Methods, and Systems for Water Electrolysis and Other Electrochemical Techniques," by Reece, et al., U.S. Provisional Patent Application Ser. No. 61/285,844, filed Dec. 11, 2009, entitled "Improved Methods and Compositions Involving Catalytic Materials, Electrodes, and Systems for Water Electrolysis and Other Electrochemical Techniques," by Esswein, et al., U.S. Provisional Patent Application Ser. No. 61/310,084, filed Mar. 3, 2010, entitled "Electrodes, Methods, and Systems for Water Electrolysis and Other Electrochemical Techniques," by Reece, et al., and U.S. Provisional Patent Application Ser. No. 61/365,102, filed Jul. 16, 2010, entitled "Electrodes, Methods, and Systems for Water Electrolysis and Other Electrochemical Techniques," by Reece, et al.

A variety of definitions are now provided which may aid in understanding various aspects of the invention.

In general, the term "aliphatic," as used herein, includes both saturated and unsaturated, straight chain (i.e., unbranched) or branched aliphatic hydrocarbons, which are optionally substituted with one or more functional groups, as defined below. As will be appreciated by one of ordinary skill in the art, "aliphatic" is intended herein to include, but is not limited to, alkyl, alkenyl, alkynyl moieties. Illustrative aliphatic groups thus include, but are not limited to, for example, methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties and the like, which again, may bear one or more substituents, as previously defined.

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. An analogous convention applies to other generic terms such as "alkenyl," "alkynyl," and the like. Furthermore, as used herein, the terms "alkyl," "alkenyl," "alkynyl," and the like encompass both substituted and unsubstituted groups.

In some embodiments, a straight chain or branched chain alkyl may have 30 or fewer carbon atoms in its backbone, and, in some cases, 20 or fewer. In some embodiments, a straight chain or branched chain alkyl has 12 or fewer carbon atoms in its backbone (e.g., $C_1$-$C_{12}$ for straight chain, $C_3$-$C_{12}$ for branched chain), has 6 or fewer, or has 4 or fewer. Likewise, cycloalkyls have from 3-10 carbon atoms in their ring structure or from 5, 6 or 7 carbons in the ring structure. Examples of alkyl groups include, but are not limited to, methyl, ethyl, propyl, isopropyl, cyclopropyl, butyl, isobutyl, tert-butyl, cyclobutyl, hexyl, cyclochexyl, and the like. In some cases, the alkyl group might not be cyclic. Examples of non-cyclic alkyl include, but are not limited to, methyl, ethyl, propyl, isopropyl, n-butyl, tert-butyl, n-pentyl, neopentyl, n-hexyl, n-heptyl, n-octyl, n-decyl, n-undecyl, and dodecyl.

The terms "alkenyl" and "alkynyl" refer to unsaturated aliphatic groups analogous in length and possible substitution to the alkyls described above, but that contain at least one double or triple bond respectively. Alkenyl groups include, but are not limited to, for example, ethenyl, propenyl, butenyl, 1-methyl-2-buten-1-yl, and the like. Non-limiting examples of alkynyl groups include ethynyl, 2-propynyl (propargyl), 1-propynyl, and the like.

The terms "heteroalkenyl" and "heteroalkynyl" refer to unsaturated aliphatic groups analogous in length and possible substitution to the heteroalkyls described above, but that contain at least one double or triple bond respectively.

As used herein, the term "halogen" or "halide" designates —F, —Cl, —Br, or —I.

The term "aryl" refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated Pi electron system, while other, adjoining rings can be cycloalkyls, cycloalkenyls, cycloalkynyls, aryls, and/or heterocycyls. The aryl group may be optionally substituted, as described herein. "Carbocyclic aryl groups" refer to aryl groups wherein the ring atoms on the aromatic ring are carbon atoms. Carbocyclic aryl groups include monocyclic carbocyclic aryl groups and polycyclic or fused compounds (e.g., two or more adjacent ring atoms are common to two adjoining rings) such as naphthyl group. Non-limiting examples of aryl groups include phenyl, naphthyl, tetrahydronaphthyl, indanyl, indenyl and the like.

The terms "heteroaryl" refers to aryl groups comprising at least one heteroatom as a ring atom, such as a heterocycle. Non-limiting examples of heteroaryl groups include pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will also be appreciated that aryl and heteroaryl moieties, as defined herein, may be attached via an aliphatic, alicyclic, heteroaliphatic, heteroalicyclic, alkyl or heteroalkyl moiety and thus also include -(aliphatic)aryl, -(heteroaliphatic)aryl, -(aliphatic)heteroaryl, -(heteroaliphatic)heteroaryl, -(alkyl)aryl, -(heteroalkyl)aryl, -(heteroalkyl)aryl, and -(heteroalkyl)-heteroaryl moieties. Thus, as used herein, the phrases "aryl or heteroaryl" and "aryl, heteroaryl, (aliphatic)aryl, -(heteroaliphatic)aryl, -(aliphatic)heteroaryl, -(heteroaliphatic)heteroaryl, -(alkyl)aryl, -(heteroalkyl)aryl, -(heteroalkyl)aryl, and -(heteroalkyl)heteroary" are interchangeable.

Any of the above groups may be optionally substituted. As used herein, the term "substituted" is contemplated to include all permissible substituents of organic compounds, "permissible" being in the context of the chemical rules of valence known to those of ordinary skill in the art. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and can not be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms.

Examples of substituents include, but are not limited to, aliphatic, alicyclic, heteroaliphatic, heteroalicyclic, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, heteroalkylthio, heteroarylthio, sulfonyl, sulfonamido, ketone, aldehyde, ester, heterocyclyl, aromatic or heteroaromatic moieties, —$CF_3$, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, -carboxamido, acyloxy, aminoalkyl, alkylaminoaryl, alkylaryl, alkylaminoalkyl, alkoxyaryl, arylamino, aralkylamino, alkylsulfonyl, -carboxamidoalkylaryl, -carboxamidoaryl, hydroxyalkyl, haloalkyl, alkylaminoalkylcarboxy-, aminocarboxamidoalkyl-, cyano, alkoxyalkyl, perhaloalkyl, arylalkyloxyalkyl, (e.g., $SO_4(R')_2$), a phosphate (e.g., $PO_4(R')_3$), a silane (e.g., $Si(R')_4$), a urethane (e.g., R'O (CO)NHR'), and the like. Additionally, the substituents may be selected from F, Cl, Br, I, —OH, —$NO_2$, —CN, —NCO, —$CF_3$, —$CH_2CF_3$, —$CHCl_2$, —$CH_2OR_x$, —$CH_2CH_2OR_x$, —$CH_2N(R_x)_2$, —$CH_2SO_2CH_3$, —$C(O)R_x$, —$O_2(R_x)$, —$CON(R_x)_2$, —$OC(O)R_x$, —$C(O)OC(O)R_x$, —$OCO_2R_x$, —$OCON(R_x)_2$, —$N(R_x)_2$, —$S(O)_2R_x$, —$OCO_2R_x$, —$NR_x$ $(CO)R_x$, —$NR_x(CO)N(R_x)_2$, wherein each occurrence of $R_x$ independently includes, but is not limited to, H, aliphatic, alicyclic, heteroaliphatic, heteroalicyclic, aryl, heteroaryl, alkylaryl, or alkylheteroaryl, wherein any of the aliphatic, alicyclic, heteroaliphatic, heteroalicyclic, alkylaryl, or alkylheteroaryl substituents described above and herein may be substituted or unsubstituted, branched or unbranched, cyclic or acyclic, and wherein any of the aryl or heteroaryl substituents described above and herein may be substituted or unsubstituted.

The following examples are intended to illustrate certain embodiments of the present invention, but do not exemplify the full scope of the invention.

EXAMPLE 1

The following example described the synthesis of an electrode comprising a nickel metal alloy (e.g., catalytic material) and the use of the electrode for the production of hydrogen gas from water. Specifically, platinum (Pt) and nickel molybdenum (NiMo) were evaluated for their catalytic ability to evolve hydrogen ($H_2$) in buffered solutions containing potassium phosphate (KPi) and potassium borate (KBi).

Materials and General Methods. Potassium phosphate (monobasic), dipotassium phosphate (dibasic), sodium citrate dihydrate, ammonium hydroxide, potassium hydroxide (KOH) (VWR), boric acid (Sigma-Aldrich), nickel sulfate hexahydrate (Alfa Aesar), and sodium molybdate dihydrate (EMD Chemicals) were used as received. Buffer solutions were prepared to 1.0 M concentration, the pH adjusted with KOH, and the solutions filtered through a 0.2 μm Nylaflo membrane (VWR) prior to use. All electrochemical experiments were performed in a three electrode cell configuration using a potentiostat (CH instruments model 760C) with a Ag/AgCl reference (BASi) and a Pt wire counter electrode (Alfa Aesar).

Electrode preparation. NiMo alloy (18% Mo) was prepared by electroplating on a Pt rotating disk electrode (RDE). Prior to deposition, the Pt RDE was polished with alumina and sonicated for 1 min in electrolyte. The electrode was further conditioned in 6M HCl electrolyte by the application of a potential cycled between oxidizing and reducing potentials according to the following sequence: +2V (60 s); –2V (60 s); +2V (60 s); –2V (10 s). The Pt RDE was then immersed in a solution containing nickel sulfate hexahydrate (64 g/L), sodium molybdate dihydrate (48 g/L), and sodium citrate dihydrate (105 g/L) with pH adjusted to 10.5 using ammonium hydroxide. A cathodic current of 100 mA/$cm^2$ was galvano statically applied to the working RDE electrode for 1 hour while rotating the electrode at 2000 RPM using an electrode rotator (Pine Instruments).

Electrochemical methods. Bulk electrolyses of Pt and NiMo RDE were performed at –200 mV overpotential for $H_2$ evolution in both electrolyte solutions (KPi: –0.810V vs. Ag/AgCl; KBi: –0.940V vs. Ag/AgCl) while rotating at 2500 rpm. A similar bulk electrolysis measurement was also performed with Pt foil (1 $cm^2$) in a custom built polycarbonate flow cell with electrolyte flowed at 110 mL/min using a peristaltic pump (Cole-Parmer Mastedlex). Each run was performed in a separate solution. Tafel plots were used to compare the catalytic activities of Pt and NiMo before and after bulk electrolysis in 1.0M KPi and 1.0M KBi. Current-potential data were obtained by measuring the current at a variety of applied potential. All Tafel experiments were performed with an RDE rotated at 2500 RPM. Reported potentials are corrected for the solution resistance, which was measured using a conventional conductivity probe. For the Pt RDE, the electrode was potentiostatically conditioned according to the procedure described above prior to each current measurement.

Figure 4A:
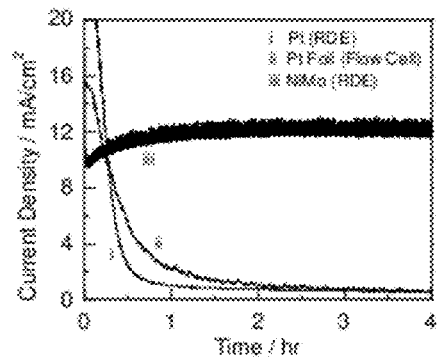
FIG. 4 show bulk electrolyses of a platinum electrode and an electrode comprising a NiMo alloy at −200 mV overpotential in water comprising A) 1.0M KPi and B) 1.0M KBi.
Figure 4B:
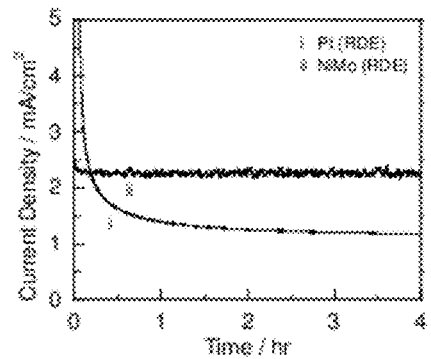

Results and Discussion. Bulk electrolyses of Pt in KPi and KBi show that the electrode activity rapidly decays during hydrogen evolution (FIG. 4). In the case of KPi electrolyte (FIG. 4A), initial activities are on the order of 15 mA/$cm^2$ (Pt foil) and 47 mA/$cm^2$ (Pt RDE), which decay to ~0.6 mA/$cm^2$ over three hours. Similar behavior was observed for the Pt RDE in KBi electrolyte (FIG. 4B). In contrast, the hydrogen evolution activity is maintained throughout electrolysis using the NiMo alloy coated electrode. FIG. 4A shows that an initial current of ~10 mA/$cm^2$ is obtained upon application of the voltage, which rises slightly to 12 mA/$cm^2$ over an hour and is maintained throughout the remainder of the electrolysis experiment. Similar performance was observed in KBi electrolyte (FIG. 4B) with an activity of 2.4 mA/$cm^2$.

Figure 5A:
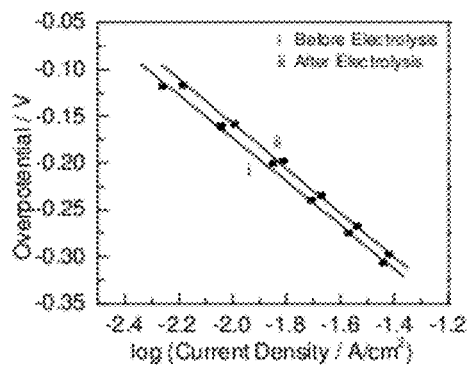
FIG. 5 shows Tafel plots of an electrode comprising a NiMo alloy before and after bulk electrolysis in water comprising A) 1.0M KPi and B) 1.0M KBi.
Figure 5B:
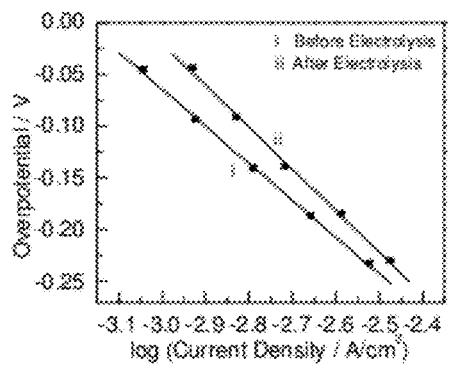

The activity was measured as a function of applied potential to generate Tafel activity plots (overpotential vs. log current density) for the NiMo alloy before and after electrolysis in both KPi (FIG. 5A) and KBi (FIG. 5B) electrolytes. The plots show that the Tafel slope and exchange current density (x-intercept) slightly increase with operation of the cathode, indicating that the NiMo functionalized electrode becomes slightly more active towards hydrogen evolution under these operating conditions and over this timescale. These data are consistent with the bulk electrolysis data described above.

EXAMPLE 2

The following example describes the preparation of stable alloys with high activity for the hydrogen evolution reaction in pH 7 phosphate and pH 9.2 borate electrolytes.

Deposition of NiMo alloy. The NiMo plating bath consists of nickel (II) sulfate hexahydrate (64 g $L^{-1}$; Alfa Aesar), sodium molybdate dihydrate (48 g $L^{-1}$; EMD), and sodium citrate dihydrate (60 g $L^{-1}$; VWR). The pH of the bath was adjusted to 10.5 using ammonium hydroxide (VWR). NiMo was deposited onto a Pt RDE substrate at a current density of 100 mA $cm^{-2}$ for one hour at a rotation rate of 2000 RPM. The resulting deposit appeared with a noticeable spiral pattern because of the rotation involved in deposition. The coloring in the spiral alternated between dark black and shiny metal with the edges consisting primarily of the shiny metal. NiMo deposits using a similar plating bath reported the presence of 75 atom % Ni and 20 atom % Mo.

Deposition of the NiFeZn alloy. The NiFeZn plating bath consists of nickel (II) sulfate hexahydrate (300 g $L^{-1}$), zinc sulfate hydrate (0.7 g $L^{-1}$; Sigma-Aldrich) and ammonium iron (II) sulfate hexahydrate (10 g $L^{-1}$; Sigma-Aldrich). NiFeZn was deposited onto a Pt RDE substrate at a current density of 100 mA $cm^{-2}$ for one hour at a rotation rate of 2000 RPM. This current density was chosen in order to correlate the resulting activity with NiMo. The resulting film was left to leach in base for 3 hours to extract Zn before evaluation. The deposit was thick, light gray and rough to the touch. No bubbles were observed during leaching.

Deposition of the NiMoCd alloy. The NiMoCd plating bath consists of nickel (II) chloride hexahydrate (9.51 g $L^{-1}$), sodium molybdate dihydrate (4.84 g L$^{-1}$), cadmium nitrate tetrahydrate (0.0925 g L$^{-1}$; Sigma-Aldrich), sodium pyrophosphate tetrabasic (34.57 g L$^{-1}$; Sigma-Aldrich) and sodium bicarbonate (74.77 g L$^{-1}$; VWR). Hydrazine hydrate (1.21 mL L$^{-1}$; Alfa Aesar) was added immediately before plating. NiMoCd was deposited onto a Pt RDE substrate at a current density of 0.0775 A cm$^{-2}$ for 30 minutes at a rotation rate of 3000 RPM. A faster rotation rate was required because hydrogen development on the substrate surface inhibited the electroplating process at 2000 RPM. The deposit was left to leach in base for 18 hours to extract Mo before evaluation. Before leaching, the deposit appeared opaque with a dark under-layer. After leaching, the deposit appeared dark. Results. For these studies, a modulated speed rotator with changedisk RDE tip was used with Pt RDE as the working electrode (Pine Instruments), Ag/AgCl as the reference electrode and Pt wire as the counter electrode. Ni was evaluated using a Ni RDE (Pine). FIG. 6 shows Tafel plots (overpotential vs. current density) for the Pt, NiMo, NiFeZn, and NiMoCd hydrogen evolving cathodes obtained while rotating the electrodes at 2000 RPM in (A) 1 M KBi, pH 9.2 and (B) 1 M KPi, pH 7 electrolytes. The data show that each material is more active when operated in phosphate as compared to borate electrolyte. Catalyst activity may be ranked in the following order Pt>NiMoCd>NiFeZn≈NiMo.

Bulk electrolyses were performed to evaluate the catalyst stability when operated in phosphate and borate electrolytes. FIG. 7 plots the current density observed for operation of the electrodes at 300 mV overpotential for the hydrogen evolution reaction over 4 hours of electrolysis time. Specifically, FIG. 7 plots the bulk electrolyses of Pt, Ni, NiMo, NiFeZn and NiMoCd at 300 mV overpotential and 2500 rpm rotation rate in (A) 1 M KPi, pH 7 and (B) 1 M KBi, pH 9.2 electrolytes. Pt exhibits a very high initial current density, which rapidly decays by >70%. The decline in activity may be attributed to impurities in the electrolyte solution (e.g., Fe) which build up on the electrode surface during operation. Similar instability results were obtained for the freshly prepared Ni electrode. In contrast, NiMoCd exhibited stable operation in both electrolytes with an active current density of 42.5 mA cm$^{-2}$ in pH 7 phosphate. NiMo and NiFeZn also exhibited stable activity with current densities in phosphate of 21.1 and 26.5 mA cm$^{-2}$, respectively.

EXAMPLE 3

The following example describes the preparation of a stable, porous electrode with high activity for the hydrogen evolution reaction in pH 7 phosphate and pH 9.2 borate electrolytes.

Materials and Methods. Ni foam (Inco Advanced Technology Materials (Dalian)Co. Ltd; 320 g/m$^2$, 1.7 mm thick), PtIr (20% Ir) wire (Strem Chemicals, Inc.), sodium molybdate (Na$_2$MoO$_4$.2H$_2$O), nickel chloride (NiCl$_2$.6H$_2$O), cadmium nitrate (Cd(NO$_3$)$_2$.4H$_2$O), sodium pyrophosphate (Na$_4$P$_2$O$_7$.4H$_2$O), sodium bicarbonate (NaHCO$_3$), and hydrazine hydrate (N$_2$H$_4$H$_2$O) (Aldrich) were used as received.

Deposition of NiMoCd alloy on Ni foam. The NiMoCd alloy was deposited on 1 cm$^2$ of Ni foam (0.5 cm$^2$ per side) as previously described. Briefly, the Ni foam substrate was immersed in a plating solution in a 3-electrode electrochemical cell containing Na$_2$MoO$_4$.2H$_2$O (0.02 M), NiCl$_2$.6H$_2$O (0.04 M), Cd(NO$_3$)$_2$.4H$_2$O (0.3 mM), Na$_4$P$_2$O$_7$.4H$_2$O (0.13 M), NaHCO$_3$ (0.89 M), and N$_2$H$_4$.H$_2$O (25 mM) at pH 7.5-9. A galvanostat was used to apply a current of 465 mA/cm$^2$ geometric surface area of the Ni foam for 30 minutes at room temperature. Plating was performed in stirred solution with a Ag/AgCl reference and Pt wire counter electrode. The electrode was then removed from plating solution and placed in 3-electrode cell with flowing electrolyte (1 M potassium phosphate (KPi) pH 7, 250 mL/min) with Ag/AgCl reference and Pt/Ir (20% Ir) wire counter electrodes. The electrode was then aged by operation for 100 hours at 1.15 A/cm$^2$ cathodic current density.

Figure 8A:
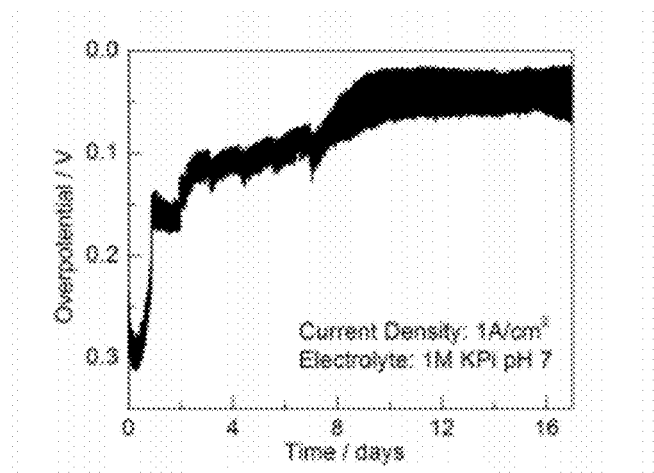
FIG. 8A shows a plot of the overpotential versus time for operation of NiMoCd on Ni foam cathode in 1 M KPi, pH 7 electrolyte.
Figure 8B:
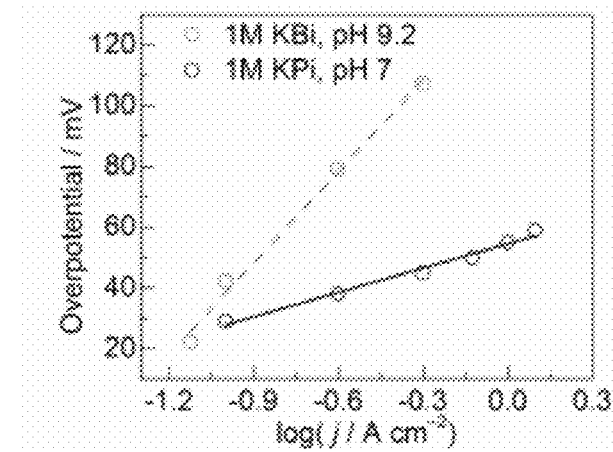
FIG. 8B shows Tafel plots of NiMoCd on Ni foam cathode in 1 M KBi and 1M KPi electrolytes.
Figure 8C:
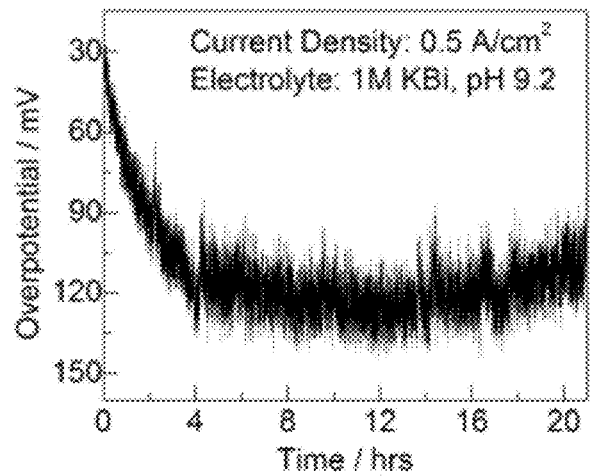
FIG. 8C shows a plot of the overpotential vs. time for operation of a NiMoCd on Ni foam cathode in 1M KBi, pH 9.2 electrolyte.

Results. FIG. 8A shows an overpotential vs. time plot for operation of the aged NiMoCd on Ni foam cathode in flowed 1 M KPi (pH 7) electrolyte. As the electrode continues to age with operation, the overpotential required to operate the electrode at 1 A/cm$^2$ continues to decrease and finally plateau near 65 mV after 70 (170 total) hours of operation. The electrode showed stable operation over a period of greater than 16 days. The activity of the electrode was then evaluated by measuring the overpotential required to operate the electrode over a range of current densities. FIG. 8B shows a plot of the overpotential versus the log of the current density (Tafel plot) for the NiMoCd on Ni foam cathode for operation in 1 M KPi (pH 7) and 1 M KBi (pH 9.2) electrolytes. The Tafel slopes from the plot are 27 and 100 mV/decade current density for operation in KPi and KBi electrolytes, respectively. The stability of the electrode during operation in KBi electrolyte was also evaluated. FIG. 8C plots the overpotential required to operate the electrode at 0.5 A/cm$^2$ cathodic current density in flowed 1 M KBi (pH 9.2) electrolyte. After an initial increase, an overpotential of ~120 mV was maintained until termination of the experiment (21 hours).

EXAMPLE 4

The following example describes the preparation of a hydrogen evolving cathode electrode that operates in unpurified water from a natural source.

Figure 9:
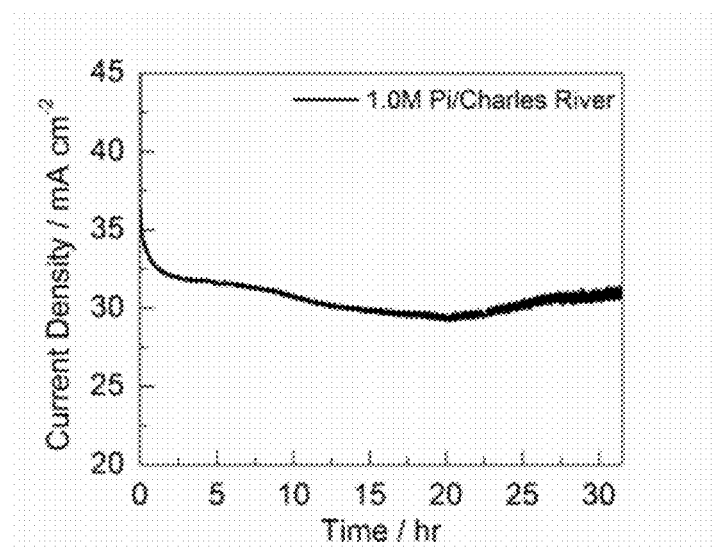
FIG. 9 shows a plot of the current density vs. time for an electrode operated in Charles River water, according to a non-limiting embodiment.

The hydrogen evolving cathode was prepared on an RDE by the method described in Example 2 and placed in 1M KPi electrolyte (pH 7) that had been prepared using water from the Charles River (Cambridge, Mass.). An Ag/AgCl reference and Pt wire counter electrode were placed in solution and a potential applied to the RDE through the use of a potentiostat. The RDE was biased at −300 mV overpotential for hydrogen evolution and rotated at 2500 rpm. FIG. 9 plots the current density obtained as a function of electrolysis time. After an initial decay in activity in the first two hours, a stable and active current density of ~31 mA/cm$^2$ was observed for the remainder of the electrolysis time (31 hours).

EXAMPLE 5

Figure 10:
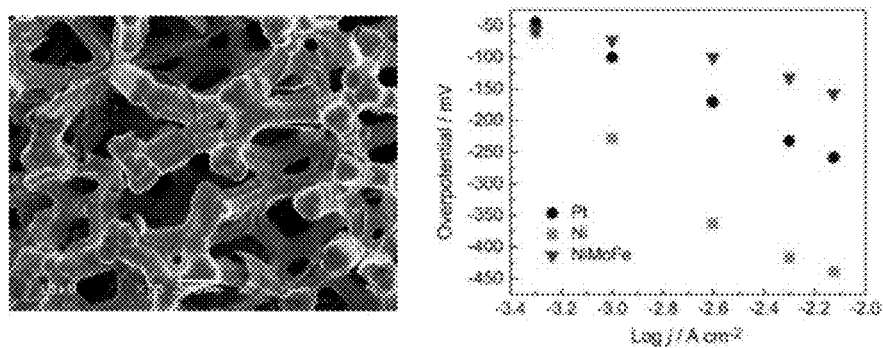
FIG. 10 shows (left) an SEM of a NiMo alloy electrode-posited on a Ni foam and (right) Tafel plots of Pt foil (●), Ni foil (■), and NiMoFe on Ni foil (▼) in 0.1 M KPi. (pH 7).

FIG. 10 (left) shows an SEM of an electrodeposited NiMo alloy prepared on Ni foam. The alloy coats the foam in a smooth and homogenous manner. FIG. 10 (right) shows Tafel activity plots for Pt and Ni foils, alongside a NiMoFe alloy prepared on Ni foil. All experiments were performed at pH 7 in 0.1 M KPi buffer. The NiMoFe alloy outperformed even Pt electrode, yielding the lowest overpotential for a given current density of the materials examined. In FIG. 10: (Left) SEM of a NiMo alloy (20% Mo) electrodeposited onto a Ni foam; (Right) Tafel plots of Pt foil (●), Ni foil (■), and NiMoFe on Ni foil (▼) in 0.1 M KPi (pH 7).

EXAMPLE 6

The following examples shows the preparation of NiMoZn alloys and their use for hydrogen evolution in pH 7 phosphate, pH 9.2 borate, and pH 14 hydroxide electrolytes.

Deposition of the NiMoZn alloy. The NiMoZn plating bath consists of nickel (II) chloride hexahydrate (9.51 g L$^{-1}$), sodium molybdate dihydrate (4.84 g L$^{-1}$), zinc chloride anhydrous(0.0409 g L$^{-1}$), sodium pyrophosphate tetrabasic (34.57 g L$^{-1}$) and sodium bicarbonate (74.77 g L$^{-1}$; VWR). Hydrazine hydrate (1.21 mL L$^{-1}$; Alfa Aesar) was added immediately before plating. NiMoZn was deposited onto a polished Pt RDE substrate at a current density of 0.0775 A cm$^{-2}$ for 30 minutes at a rotation rate of 3000 RPM. The deposit was left to leach in base for 16+ hours in 10M KOH. Successful leaching was indicated by bubbles evolving from the electrode surface. After leaching, the deposit became slightly darker in appearance.

Results. For these studies, a modulated speed rotator with changedisk RDE tip was used with Pt RDE as the working electrode (Pine Instruments) and RuO$_2$ as the counter electrode. An Ag/AgCl reference electrodes was used to evaluate the alloy in 1.0M KPi and 1.0M KBi while a Hg/HgO reference electrode was used to evaluate the alloy in 1.0M KOH.

Figure 11A:
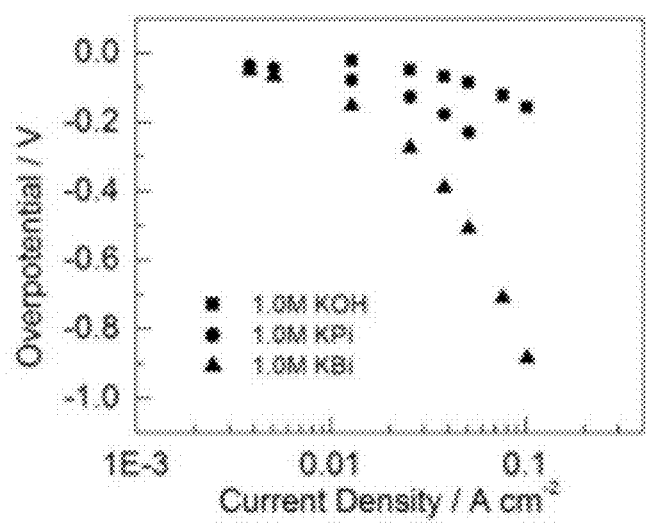
FIG. 11A shows Tafel plots of NiMoZn hydrogen evolving cathode when operated in 1.0 M KOH, 1.0M KPi, and 1.0M KBi electrolytes.
Figure 11B:
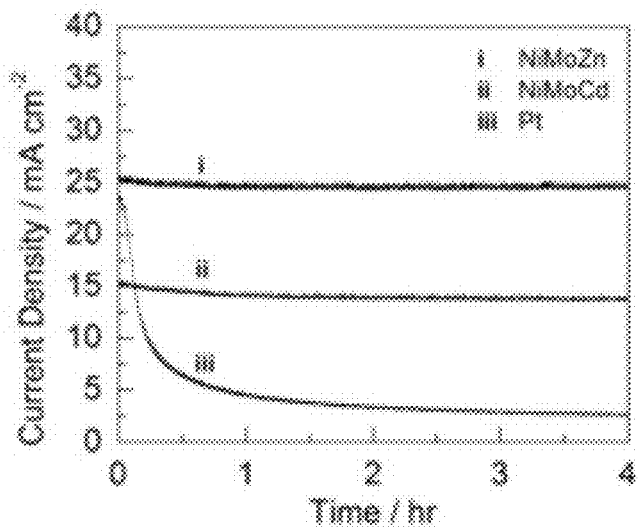
FIG. 11B shows the bulk electrolyses of NiMoZn, NiMoCd, and Pt.

FIG. 11A shows Tafel plots (overpotential vs. current density) of NiMoZn hydrogen evolving cathode when operated in 1.0 M KOH (pH 14.0), 1.0M KPi (pH 7.0) and 1.0M KBi (pH 9.2) electrolytes at 2500 rpm. This data shows that operation in 1.0M KOH yields the highest activity. Bulk electrolyses of NiMoZn, NiMoCd and Pt in 1.0M KBi were completed to evaluate catalyst stability. FIG. 11B shows the change in current density over a 4-hour time period of electrodes operated at 300 mV overpotential for hydrogen evolution. More specifically, FIG. 11B shows the Bulk electrolyses of NiMoZn, NiMoCd, and Pt at 300 mV overpotential and 2500 rpm in 1.0M KBi (pH 9.2) electrolyte. Pt initially demonstrated a high current density but rapidly declined by 90%. Without wishing to be bound by theory, this may be due to the presence of impurities in solution, which build up on the electrode surface during operation. Both NiMoCd and NiMoZn exhibited high and stable current activity. NiMoZn exhibited the highest with a current density of 25 mA/cm$^2$ while NiMoCd maintained a current density of 14 mA/cm$^2$.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. A system capable of forming hydrogen and/or oxygen gas, comprising:
a catalytic material comprising a first metal type selected to be capable of catalyzing the formation of hydrogen gas, oxygen gas, or both from water,
the first metal type comprising Ni, Co, Fe, Cu, Mo, W, Rh, Ru, Os, Ir, Pt, Pd, or any combination thereof;
a second metal type comprising Zn, Cd, Sn, In, Pb, Sb, Te, Bi, Hg, Ag, Au, Pd, Pt, Li, Na, K, Mg, Ca, Sr, Al, Cr, or any combination thereof,
the first and second metals differing from one another, and
a third metal type comprising V, Cr, Mo, W, Mn, Ca, Mg, Si, Zn, Al, Ag, Se or any combination thereof,
the first, second, and third metal types being alloyed together; and
a photoactive composition.

2. The system of claim 1, wherein the photoactive composition comprises a photovoltaic cell, a triple-junction a-Si photovoltaic cell, a semiconductor, or a p-type semiconductor photocathode.

3. A system capable of forming hydrogen and/or oxygen gas under illumination, comprising:
a catalytic material comprising a first metal type selected to be capable of catalyzing the formation of hydrogen gas from water,
the first metal type comprising Ni, Co, Fe, Cu, Mo, W, Rh, Ru, Os, Ir, Pt, Pd, or any combination thereof;
a second metal type comprising Zn, Cd, Sn, In, Pb, Sb, Te, Bi, Hg, Ag, Au, Pd, Pt, Li, Na, K, Mg, Ca, Sr, Al, Cr or any combination thereof,
the first and second metal types differing from one another, and
a third metal type comprising V, Cr, Mo, W, Mn, Ca, Mg, Si, Zn, Al, Ag, Se or any combination thereof,
a photoactive composition comprising a photovoltaic cell, a triple junction a-Si photovoltaic cell, a semiconductor, or a p-type semiconductor photocathode.

4. A system capable of forming hydrogen and/or oxygen gas in the presence of an anionic species, comprising:
an electrode, the electrode including a catalytic material comprising
(a) a first metal type selected to be capable of catalyzing the formation of hydrogen gas, oxygen gas, or both from water,
the first metal type comprising Ni, Co, Fe, Cu, Mo, W, Rh, Ru, Os, Ir, Pt, Pd, or any combination thereof;
(b) a second metal type having an association constant of less than about $10^{-3}$ $M^{-1}$ with the anionic species, and
(c) a third metal type,
the first, second, and third metal types being alloyed together, and
the third metal type dealloying from the catalytic material under set conditions at least twice the rate of any dealloying of the first or second metals at the set conditions.

* * * * *